United States Patent
Kurokawa

(10) Patent No.: US 10,593,172 B2
(45) Date of Patent: Mar. 17, 2020

(54) IMAGING DEVICE, MONITORING DEVICE, AND ELECTRONIC APPLIANCE

(71) Applicant: Semiconductor Energy Laboratory Co., LTD., Atsugi-shi, Kanagawa-ken (JP)

(72) Inventor: Yoshiyuki Kurokawa, Kanagawa (JP)

(73) Assignee: Semiconductor Energy Laboratory Co., Ltd., Kanagawa-ken (JP)

(*) Notice: Subject to any disclaimer, the term of this patent is extended or adjusted under 35 U.S.C. 154(b) by 523 days.

(21) Appl. No.: 14/708,667

(22) Filed: May 11, 2015

(65) Prior Publication Data

US 2015/0332568 A1 Nov. 19, 2015

(30) Foreign Application Priority Data

May 16, 2014 (JP) .................................. 2014-101910
May 21, 2014 (JP) .................................. 2014-104842
(Continued)

(51) Int. Cl.
*H04N 5/3745* (2011.01)
*G08B 13/196* (2006.01)
(Continued)

(52) U.S. Cl.
CPC . *G08B 13/19604* (2013.01); *G08B 13/19602* (2013.01); *H04N 5/23245* (2013.01);
(Continued)

(58) Field of Classification Search
CPC ......... G08B 13/19602; H04N 5/37452; H04N 5/3745
See application file for complete search history.

(56) References Cited

U.S. PATENT DOCUMENTS 5,481,484 A * 1/1996 Ogawa ............... G01R 31/3167
703/14
5,705,807 A 1/1998 Throngnumchai et al.
(Continued)

FOREIGN PATENT DOCUMENTS

EP 1737044 A 12/2006
EP 2226847 A 9/2010
(Continued)

OTHER PUBLICATIONS

Asakuma.N et al., "Crystallization and Reduction of Sol-Gel-Derived Zinc Oxide Films by Irradiation With Ultraviolet Lamp", Journal of Sol-Gel Science and Technology, 2003, vol. 26, pp. 181-184.
(Continued)

*Primary Examiner* — Rowina J Cattungal
(74) *Attorney, Agent, or Firm* — Nixon Peabody LLP; Jeffrey L. Costellia

(57) ABSTRACT

An imaging device capable of detecting differences with low power consumption is provided. The imaging device includes a pixel including a photoelectric conversion element and a transistor; an analog processing circuit; and a digital processing circuit. The imaging device is operated in a first mode and a second mode. In the first mode, the analog processing circuit detects a difference between first imaging data taken by the pixel and second imaging data taken by the pixel and generates a trigger signal on the basis of the value of the difference. In the second mode, the digital processing circuit converts third imaging data taken by the pixel into digital data. Switching from the first mode to the second mode is performed on the basis of the trigger signal.

16 Claims, 15 Drawing Sheets

(30) Foreign Application Priority Data

Jun. 25, 2014 (JP) ................................ 2014-129984
Jun. 25, 2014 (JP) ................................ 2014-129988

(51) Int. Cl.
*H04N 5/232* (2006.01)
*H04N 5/378* (2011.01)

(52) U.S. Cl.
CPC .......... *H04N 5/378* (2013.01); *H04N 5/3745* (2013.01); *H04N 5/37452* (2013.01); *H04N 5/37455* (2013.01)

(56) References Cited

U.S. PATENT DOCUMENTS

| | | |
|---|---|---|
| 5,731,856 A | 3/1998 | Kim et al. |
| 5,744,864 A | 4/1998 | Cillessen et al. |
| 6,294,274 B1 | 9/2001 | Kawazoe et al. |
| 6,563,174 B2 | 5/2003 | Kawasaki et al. |
| 6,727,522 B1 | 4/2004 | Kawasaki et al. |
| 7,046,282 B1 | 5/2006 | Zhang et al. |
| 7,049,190 B2 | 5/2006 | Takeda et al. |
| 7,061,014 B2 | 6/2006 | Hosono et al. |
| 7,064,346 B2 | 6/2006 | Kawasaki et al. |
| 7,105,868 B2 | 9/2006 | Nause et al. |
| 7,211,825 B2 | 5/2007 | Shih et al. |
| 7,282,782 B2 | 10/2007 | Hoffman et al. |
| 7,297,977 B2 | 11/2007 | Hoffman et al. |
| 7,323,356 B2 | 1/2008 | Hosono et al. |
| 7,385,224 B2 | 6/2008 | Ishii et al. |
| 7,402,506 B2 | 7/2008 | Levy et al. |
| 7,411,209 B2 | 8/2008 | Endo et al. |
| 7,453,065 B2 | 11/2008 | Saito et al. |
| 7,453,087 B2 | 11/2008 | Iwasaki |
| 7,462,862 B2 | 12/2008 | Hoffman et al. |
| 7,468,304 B2 | 12/2008 | Kaji et al. |
| 7,501,293 B2 | 3/2009 | Ito et al. |
| 7,674,650 B2 | 3/2010 | Akimoto et al. |
| 7,732,819 B2 | 6/2010 | Akimoto et al. |
| 8,576,317 B2 | 11/2013 | Sakakibara et al. |
| 9,924,076 B2 | 3/2018 | Sekine |
| 2001/0046027 A1 | 11/2001 | Tai et al. |
| 2002/0056838 A1 | 5/2002 | Ogawa |
| 2002/0132454 A1 | 9/2002 | Ohtsu et al. |
| 2003/0189401 A1 | 10/2003 | Kido et al. |
| 2003/0218222 A1 | 11/2003 | Wager, III et al. |
| 2004/0038446 A1 | 2/2004 | Takeda et al. |
| 2004/0127038 A1 | 7/2004 | Carcia et al. |
| 2005/0017302 A1 | 1/2005 | Hoffman |
| 2005/0199959 A1 | 9/2005 | Chiang et al. |
| 2006/0035452 A1 | 2/2006 | Carcia et al. |
| 2006/0043377 A1 | 3/2006 | Hoffman et al. |
| 2006/0091793 A1 | 5/2006 | Baude et al. |
| 2006/0108529 A1 | 5/2006 | Saito et al. |
| 2006/0108636 A1 | 5/2006 | Sano et al. |
| 2006/0110867 A1 | 5/2006 | Yabuta et al. |
| 2006/0113536 A1 | 6/2006 | Kumomi et al. |
| 2006/0113539 A1 | 6/2006 | Sano et al. |
| 2006/0113549 A1 | 6/2006 | Den et al. |
| 2006/0113565 A1 | 6/2006 | Abe et al. |
| 2006/0169973 A1 | 8/2006 | Isa et al. |
| 2006/0170111 A1 | 8/2006 | Isa et al. |
| 2006/0197092 A1 | 9/2006 | Hoffman et al. |
| 2006/0208977 A1 | 9/2006 | Kimura |
| 2006/0228974 A1 | 10/2006 | Thelss et al. |
| 2006/0231882 A1 | 10/2006 | Kim et al. |
| 2006/0238135 A1 | 10/2006 | Kimura |
| 2006/0244107 A1 | 11/2006 | Sugihara et al. |
| 2006/0284171 A1 | 12/2006 | Levy et al. |
| 2006/0284172 A1 | 12/2006 | Ishii |
| 2006/0292777 A1 | 12/2006 | Dunbar |
| 2007/0024187 A1 | 2/2007 | Shin et al. |
| 2007/0046191 A1 | 3/2007 | Saito |
| 2007/0052025 A1 | 3/2007 | Yabuta |
| 2007/0054507 A1 | 3/2007 | Kaji et al. |
| 2007/0064135 A1 | 3/2007 | Brown et al. |
| 2007/0090365 A1 | 4/2007 | Hayashi et al. |
| 2007/0108446 A1 | 5/2007 | Akimoto |
| 2007/0152217 A1 | 7/2007 | Lai et al. |
| 2007/0172591 A1 | 7/2007 | Seo et al. |
| 2007/0187678 A1 | 8/2007 | Hirao et al. |
| 2007/0187760 A1 | 8/2007 | Furuta et al. |
| 2007/0194379 A1 | 8/2007 | Hosono et al. |
| 2007/0252928 A1 | 11/2007 | Ito et al. |
| 2007/0272922 A1 | 11/2007 | Kim et al. |
| 2007/0287296 A1 | 12/2007 | Chang |
| 2008/0002857 A1* | 1/2008 | Tsunashima ............ H04N 7/18 382/103 |
| 2008/0006877 A1 | 1/2008 | Mardilovich et al. |
| 2008/0038882 A1 | 2/2008 | Takechi et al. |
| 2008/0038929 A1 | 2/2008 | Chang |
| 2008/0049128 A1 | 2/2008 | Murata et al. |
| 2008/0050595 A1 | 2/2008 | Nakagawara et al. |
| 2008/0073653 A1 | 3/2008 | Iwasaki |
| 2008/0083950 A1 | 4/2008 | Pan et al. |
| 2008/0106191 A1 | 5/2008 | Kawase |
| 2008/0128689 A1 | 6/2008 | Lee et al. |
| 2008/0129195 A1 | 6/2008 | Ishizaki et al. |
| 2008/0166834 A1 | 7/2008 | Kim et al. |
| 2008/0182358 A1 | 7/2008 | Cowdery-Corvan et al. |
| 2008/0224133 A1 | 9/2008 | Park et al. |
| 2008/0254569 A1 | 10/2008 | Hoffman et al. |
| 2008/0258139 A1 | 10/2008 | Ito et al. |
| 2008/0258140 A1 | 10/2008 | Lee et al. |
| 2008/0258141 A1 | 10/2008 | Park et al. |
| 2008/0258143 A1 | 10/2008 | Kim et al. |
| 2008/0296568 A1 | 12/2008 | Ryu et al. |
| 2009/0068773 A1 | 3/2009 | Lai et al. |
| 2009/0073325 A1 | 3/2009 | Kuwabara et al. |
| 2009/0101948 A1 | 4/2009 | Park et al. |
| 2009/0114910 A1 | 5/2009 | Chang |
| 2009/0134399 A1 | 5/2009 | Sakakura et al. |
| 2009/0152506 A1 | 6/2009 | Umeda et al. |
| 2009/0152541 A1 | 6/2009 | Maekawa et al. |
| 2009/0278122 A1 | 11/2009 | Hosono et al. |
| 2009/0280600 A1 | 11/2009 | Hosono et al. |
| 2010/0065844 A1 | 3/2010 | Tokunaga |
| 2010/0092800 A1 | 4/2010 | Itagaki et al. |
| 2010/0109002 A1 | 5/2010 | Itagaki et al. |
| 2010/0182470 A1* | 7/2010 | Sugawa ................ H04N 5/374 348/294 |
| 2011/0133706 A1 | 6/2011 | Takahashi et al. |
| 2011/0176038 A1 | 7/2011 | Kurokawa et al. |
| 2011/0198483 A1 | 8/2011 | Kurokawa |
| 2011/0199526 A1* | 8/2011 | Nitta .................. H03M 1/1023 348/308 |
| 2011/0304768 A1* | 12/2011 | Chen .................. H03M 1/1255 348/537 |
| 2012/0002090 A1 | 1/2012 | Aoki et al. |
| 2013/0016035 A1 | 1/2013 | Ikeda |
| 2013/0222584 A1* | 8/2013 | Aoki ..................... H04N 5/335 348/143 |
| 2014/0036123 A1 | 2/2014 | Sakakibara et al. |

FOREIGN PATENT DOCUMENTS

| | | |
|---|---|---|
| EP | 2913994 A | 9/2015 |
| JP | 60-198861 A | 10/1985 |
| JP | 63-210022 A | 8/1988 |
| JP | 63-210023 A | 8/1988 |
| JP | 63-210024 A | 8/1988 |
| JP | 63-215519 A | 9/1988 |
| JP | 63-239117 A | 10/1988 |
| JP | 63-265818 A | 11/1988 |
| JP | 05-251705 A | 9/1993 |
| JP | 08-264794 A | 10/1996 |
| JP | 11-505377 | 5/1999 |
| JP | 2000-044236 A | 2/2000 |
| JP | 2000-150900 A | 5/2000 |
| JP | 2002-076356 A | 3/2002 |
| JP | 2002-289859 A | 10/2002 |
| JP | 2003-032668 A | 1/2003 |
| JP | 2003-086000 A | 3/2003 |

(56) References Cited

FOREIGN PATENT DOCUMENTS

| | | |
|---|---|---|
| JP | 2003-086808 A | 3/2003 |
| JP | 2004-103957 A | 4/2004 |
| JP | 2004-273614 A | 9/2004 |
| JP | 2004-273732 A | 9/2004 |
| JP | 2008-042827 A | 2/2008 |
| WO | WO-2004/114391 | 12/2004 |
| WO | WO-2014/069212 | 5/2014 |

OTHER PUBLICATIONS

Asaoka.Y et al., "29.1:Polarizer-Free Reflective LCD Combined With Ultra Low-Power Driving Technology", SID Digest '09 : SID International Symposium Digest of Technical Papers, May 31, 2009, pp. 395-398.
Chern.H et al., "An Analytical Model for the Above-Threshold Characteristics of Polysilicon Thin-Film Transistors", IEEE Transactions on Electron Devices, Jul. 1, 1995, vol. 42, No. 7, pp. 1240-1246.
Cho.D et al., "21.2:Al and Sn-Doped Zinc Indium Oxide Thin Film Transistors for AMOLED Backplane", SID Digest '09 : SID International Symposium Digest of Technical Papers, May 31, 2009, pp. 280-283.
Clark.S et al., "First Principles Methods Using Castep", Zeitschrift fur Kristallographie, 2005, vol. 220, pp. 567-570.
Coates.D et al., "Optical Studies of the Amorphous Liquid-Cholesteric Liquid Crystal Transition:The "Blue Phase"", Physics Letters, Sep. 10, 1973, vol. 45A, No. 2, pp. 115-116.
Costello.M et al., "Electron Microscopy of a Cholesteric Liquid Crystal and Its Blue Phase", Phys. Rev. A (Physical Review. A), May 1, 1984, vol. 29, No. 5, pp. 2957-2959.
Dembo.H et al., "RFCPUS on Glass and Plastic Substrates Fabricated by TFT Transfer Technology", IEDM 05: Technical Digest of International Electron Devices Meeting, Dec. 5, 2005, pp. 1067-1069.
Fortunato.E et al., "Wide-Bandgap High-Mobility ZnO Thin-Film Transistors Produced At Room Temperature", Appl. Phys. Lett. (Applied Physics Letters) , Sep. 27, 2004, vol. 85, No. 13, pp. 2541-2543.
Fung.T et al., "2-D Numerical Simulation of High Performance Amorphous In—Ga—Zn—O TFTs for Flat Panel Displays", AM-FPD '08 Digest of Technical Papers, Jul. 2, 2008, pp. 251-252, The Japan Society of Applied Physics.
Godo.H et al., "P-9:Numerical Analysis on Temperature Dependence of Characteristics of Amorphous In—Ga—Zn-Oxide TFT", SID Digest '09 : SID International Symposium Digest of Technical Papers, May 31, 2009, pp. 1110-1112.
Godo.H et al., "Temperature Dependence of Characteristics and Electronic Structure for Amorphous In—Ga—Zn-Oxide TFT", AM-FPD '09 Digest of Technical Papers, Jul. 1, 2009, pp. 41-44.
Hayashi.R et al., "42.1: Invited Paper: Improved Amorphous In—Ga—Zn—O TFTS", SID Digest '08 : SID International Symposium Digest of Technical Papers, May 20, 2008, vol. 39, pp. 621-624.
Hirao.T et al., "Novel Top-Gate Zinc Oxide Thin-Film Transistors (ZNO TFTS) for AMLCDS", J. Soc. Inf. Display (Journal of the Society for Information Display), 2007, vol. 15, No. 1, pp. 17-22.
Hosono.H et al., "Working hypothesis to explore novel wide band gap electrically conducting amorphous oxides and examples", J. Non-Cryst. Solids (Journal of Non-Crystalline Solids), 1996, vol. 198-200, pp. 165-169.
Hosono.H, "68.3:Invited Paper:Transparent Amorphous Oxide Semiconductors for High Performance TFT", SID Digest '07 : SID International Symposium Digest of Technical Papers, 2007, vol. 38, pp. 1830-1833.
Hsieh.H et al., "P-29:Modeling of Amorphous Oxide Semiconductor Thin Film Transistors and Subgap Density of States", SID Digest '08 : SID International Symposium Digest of Technical Papers, May 20, 2008, vol. 39, pp. 1277-1280.
Ikeda.T et al., "Full-Functional System Liquid Crystal Display Using CG-Silicon Technology", SID Digest '04 : SID International Symposium Digest of Technical Papers, 2004, vol. 35, pp. 860-863.
Janotti.A et al., "Native Point Defects in ZnO", Phys. Rev. B (Physical Review. B), Oct. 4, 2007, vol. 76, No. 16, pp. 165202-1-165202-22.
Janotti.A et al., "Oxygen Vacancies in ZnO", Appl. Phys. Lett. (Applied Physics Letters) , 2005, vol. 87, pp. 122102-1-122102-3.
Jeong.J et al., "3.1: Distinguished Paper: 12.1-Inch WXGA AMOLED Display Driven by Indium-Gallium-Zinc Oxide TFTs Array", SID Digest '08 : SID International Symposium Digest of Technical Papers, May 20, 2008, vol. 39, No. 1, pp. 1-4.
Jin.D et al., "65.2:Distinguished Paper:World-Largest (6.5") Flexible Full Color Top Emission AMOLED Display on Plastic Film and its Bending Properties", SID Digest '09 : SID International Symposium Digest of Technical Papers, May 31, 2009, pp. 983-985.
Kanno.H et al., "White Stacked Electrophosphorecent Organic Light-Emitting Devices Employing MOO3 as a Charge-Generation Layer", Adv. Mater. (Advanced Materials), 2006, vol. 18, No. 3, pp. 339-342.
Kikuchi.H et al., "39.1:Invited Paper:Optically Isotropic Nano-Structured Liquid Crystal Composites for Display Applications", SID Digest '09 : SID International Symposium Digest of Technical Papers, May 31, 2009, pp. 578-581.
Kikuchi.H et al., "62.2:Invited Paper:Fast Electro-Optical Switching in Polymer-Stabilized Liquid Crystalline Blue Phases For Display Application", SID Digest '07 : SID International Symposium Digest of Technical Papers, 2007, vol. 38, pp. 1737-1740.
Kikuchi.H et al., "Polymer-Stabilized Liquid Crystal Blue Phases", Nature Materials, Sep. 2, 2002, vol. 1, pp. 64-68.
Kim.S et al., "High-Performance oxide thin film transistors passivated by various gas plasmas", 214th ECS Meeting, 2008, No. 2317, ECS.
Kimizuka.N et al., "Spinel,YBFE2O4, and YB2FE3O7 Types of Structures for Compounds in the In2O3 and Sc2O3—A2O3—Bo Systems [A; Fe, Ga, or Al; B: Mg, Mn, Fe, Ni, Cu or Zn] At Temperatures Over 1000° C.", Journal of Solid State Chemistry, 1985, vol. 60, pp. 382-384.
Kimizuka.N et al., "Syntheses and Single-Crystal Data of Homologous Compounds, In2O3(ZnO)m (m = 3, 4, and 5), InGaO3(ZnO)3, and Ga2O3(ZnO)m (m = 7, 8, 9, and 16) in the In2O3—ZnGa2O4—ZnO System", Journal of Solid State Chemistry, Apr. 1, 1995, vol. 116, No. 1, pp. 170-178.
Kitzerow.H et al., "Observation of Blue Phases in Chiral Networks", Liquid Crystals, 1993, vol. 14, No. 3, pp. 911-916.
Kurokawa.Y et al., "UHF RFCPUS on Flexible and Glass Substrates for Secure RFID Systems", Journal of Solid-State Circuits , 2008, vol. 43, No. 1, pp. 292-299.
Lany.S et al., "Dopability, Intrinsic Conductivity, and Nonstoichiometry of Transparent Conducting Oxides", Phys. Rev. Lett. (Physical Review Letters), Jan. 26, 2007, vol. 98, pp. 045501-1-045501-4.
Lee.H et al., "Current Status of, Challenges to, and Perspective View of AM-OLED", IDW '06 : Proceedings of the 13th International Display Workshops, Dec. 7, 2006, pp. 663-666.
Lee.J et al., "World's Largest (15-Inch) XGA AMLCD Panel Using IGZO Oxide TFT", SID Digest '08 : SID International Symposium Digest of Technical Papers, May 20, 2008, vol. 39, pp. 625-628.
Lee.M et al., "15.4:Excellent Performance of Indium-Oxide-Based Thin-Film Transistors by DC Sputtering", SID Digest '09 : SID International Symposium Digest of Technical Papers, May 31, 2009, pp. 191-193.
Li.C et al., "Modulated Structures of Homologous Compounds InMO3(ZnO)m (M=In,Ga; m=Integer) Described by Four-Dimensional Superspace Group", Journal of Solid State Chemistry, 1998, vol. 139, pp. 347-355.
Masuda.S et al., "Transparent thin film transistors using ZnO as an active channel layer and their electrical properties", J. Appl. Phys. (Journal of Applied Physics) , Feb. 1, 2003, vol. 93, No. 3, pp. 1624-1630.
Meiboom.S et al., "Theory of the Blue Phase of Cholesteric Liquid Crystals", Phys. Rev. Lett. (Physical Review Letters), May 4, 1981, vol. 46, No. 18, pp. 1216-1219.
Miyasaka.M, "Suftla Flexible Microelectronics on Their Way to Business", SID Digest '07 : SID International Symposium Digest of Technical Papers, 2007, vol. 38, pp. 1673-1676.

(56) References Cited

OTHER PUBLICATIONS

Mo.Y et al., "Amorphous Oxide TFT Backplanes for Large Size AMOLED Displays", IDW '08 : Proceedings of the 6th International Display Workshops, Dec. 3, 2008, pp. 581-584.

Nakamura.M et al., "The phase relations in the $In_2O_3$—$Ga_2ZnO_4$—$ZnO$ system at 1350° C.", Journal of Solid State Chemistry, Aug. 1, 1991, vol. 93, No. 2, pp. 298-315.

Nakamura.M, "Synthesis of Homologous Compound with New Long-Period Structure", NIRIM Newsletter, Mar. 1, 1995, vol. 150, pp. 1-4.

Nomura.K et al., "Amorphous Oxide Semiconductors for High-Performance Flexible Thin-Film Transistors", Jpn. J. Appl. Phys. (Japanese Journal of Applied Physics), 2006, vol. 45, No. 5B, pp. 4303-4308.

Nomura.K et al., "Carrier transport in transparent oxide semiconductor with intrinsic structural randomness probed using single-crystalline $InGaO_3(ZnO)_5$ films", Appl. Phys. Lett. (Applied Physics Letters), Sep. 13, 2004, vol. 85, No. 11, pp. 1993-1995.

Nomura.K et al., "Room-Temperature Fabrication of Transparent Flexible Thin-Film Transistors Using Amorphous Oxide Semiconductors", Nature, Nov. 25, 2004, vol. 432, pp. 488-492.

Nomura.K et al., "Thin-Film Transistor Fabricated in Single-Crystalline Transparent Oxide Semiconductor", Science, May 23, 2003, vol. 300, No. 5623, pp. 1269-1272.

Nowatari.H et al., "60.2: Intermediate Connector With Suppressed Voltage Loss for White Tandem OLEDS", SID Digest '09 : SID International Symposium Digest of Technical Papers, May 31, 2009, vol. 40, pp. 899-902.

Oba.F et al., "Defect energetics in ZnO: A hybrid Hartree-Fock density functional study", Phys. Rev. B (Physical Review. B), 2008, vol. 77, pp. 245202-1-245202-6.

Oh.M et al., "Improving the Gate Stability of ZnO Thin-Film Transistors With Aluminum Oxide Dielectric Layers", J. Electrochem. Soc. (Journal of the Electrochemical Society), 2008, vol. 155, No. 12, pp. H1009-H1014.

Ohara.H et al., "21.3:4.0 In. QVGA AMOLED Display Using In—Ga—Zn-Oxide TFTS With a Novel Passivation Layer", SID Digest '09 : SID International Symposium Digest of Technical Papers, May 31, 2009, pp. 284-287.

Ohara.H et al., "Amorphous In—Ga—Zn-Oxide TFTs with Suppressed Variation for 4.0 inch QVGA AMOLED Display", AM-FPD '09 Digest of Technical Papers, Jul. 1, 2009, pp. 227-230, The Japan Society of Applied Physics.

Orita.M et al., "Amorphous transparent conductive oxide $InGaO_3(ZnO)_m$ (m<4):a $Zn_4s$ conductor", Philosophical Magazine, 2001, vol. 81, No. 5, pp. 501-515.

Orita.M et al., "Mechanism of Electrical Conductivity of Transparent $InGaZnO_4$", Phys. Rev. B (Physical Review. B), Jan. 15, 2000, vol. 61, No. 3, pp. 1811-1816.

Osada.T et al., "15.2: Development of Driver-Integrated Panel using Amorphous In—Ga—Zn-Oxide TFT", SID Digest '09 : SID International Symposium Digest of Technical Papers, May 31, 2009, vol. 40, pp. 184-187.

Osada.T et al., "Development of Driver-Integrated Panel Using Amorphous In—Ga—Zn-Oxide TFT", AM-FPD '09 Digest of Technical Papers, Jul. 1, 2009, pp. 33-36.

Park.J et al., "Amorphous Indium-Gallium-Zinc Oxide TFTS and Their Application for Large Size AMOLED", AM-FPD '08 Digest of Technical Papers, Jul. 2, 2008, pp. 275-278.

Park.J et al., "Dry etching of ZnO films and plasma-induced damage to optical properties", J. Vac. Sci. Technol. B (Journal of Vacuum Science & Technology B), Mar. 1, 2003, vol. 21, No. 2, pp. 800-803.

Park.J et al., "Electronic Transport Properties of Amorphous Indium-Gallium-Zinc Oxide Semiconductor Upon Exposure to Water", Appl. Phys. Lett. (Applied Physics Letters), 2008, vol. 92, pp. 072104-1-0272104-3.

Park.J et al., "High performance amorphous oxide thin film transistors with self-aligned top-gate structure", IEDM 09: Technical Digest of International Electron Devices Meeting, Dec. 7, 2009, pp. 191-194.

Park.J et al., "Improvements in the Device Characteristics of Amorphous Indium Gallium Zinc Oxide Thin-Film Transistors by Ar Plasma Treatment", Appl. Phys. Lett. (Applied Physics Letters), Jun. 26, 2007, vol. 90, No. 26, pp. 262106-1-262106-3.

Park.S et al., "Challenge to Future Displays: Transparent AM-OLED Driven by PEALD Grown ZnO TFT", IMID '07 Digest, 2007, pp. 1249-1252.

Park.S et al., "42.3: Transparent ZnO Thin Film Transistor for the Application of High Aperture Ratio Bottom Emission AM-OLED Display", SID Digest '08 : SID International Symposium Digest of Technical Papers, May 20, 2008, vol. 39, pp. 629-632.

Prins.M et al., "A Ferroelectric Transparent Thin-Film Transistor", Appl. Phys. Lett. (Applied Physics Letters), Jun. 17, 1996, vol. 68, No. 25, pp. 3650-3652.

Sakata.J et al., "Development of 4.0-In. AMOLED Display With Driver Circuit Using Amorphous In—Ga—Zn-Oxide TFTS", IDW '09 : Proceedings of the 16th International Display Workshops, 2009, pp. 689-692.

Son.K et al., "42.4L: Late-News Paper: 4 Inch QVGA AMOLED Driven by the Threshold Voltage Controlled Amorphous GIZO ($Ga_2O_3$—$In_2O_3$—$ZnO$) TFT", SID Digest '08 : SID International Symposium Digest of Technical Papers, May 20, 2008, vol. 39, pp. 633-636.

Takahashi.M et al., "Theoretical Analysis of IGZO Transparent Amorphous Oxide Semiconductor", IDW '08 : Proceedings of the 15th International Display Workshops, Dec. 3, 2008, pp. 1637-1640.

Tsuda.K et al., "Ultra Low Power Consumption Technologies for Mobile TFT-LCDs ", IDW '02 : Proceedings of the 9th International Display Workshops, Dec. 4, 2002, pp. 295-298.

Ueno.K et al., "Field-Effect Transistor on $SrTiO_3$ With Sputtered $Al_2O_3$ Gate Insulator", Appl. Phys. Lett. (Applied Physics Letters), Sep. 1, 2003, vol. 83, No. 9, pp. 1755-1757.

Van de Walle.C, "Hydrogen as a Cause of Doping in Zinc Oxide", Phys. Rev. Lett. (Physical Review Letters), Jul. 31, 2000, vol. 85, No. 5, pp. 1012-1015.

Taiwanese Office Action (Application No. 104115252) dated Nov. 30, 2018.

* cited by examiner

FIG. 3A1
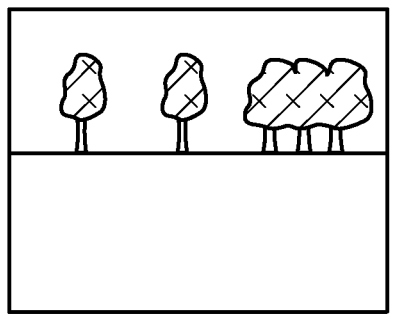
1st Imaging Data
FIG. 3A2
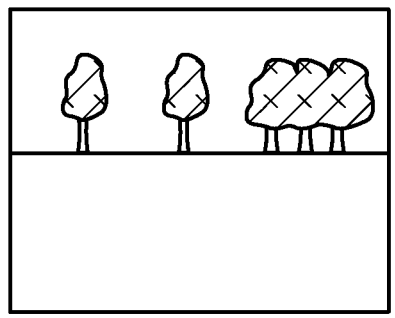
2nd Imaging Data
FIG. 3B1
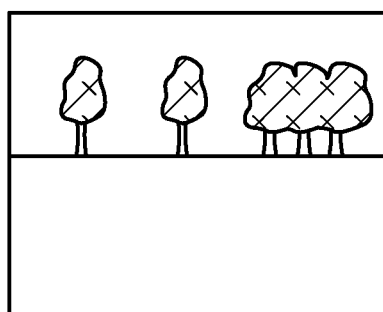
1st Imaging Data
FIG. 3B2
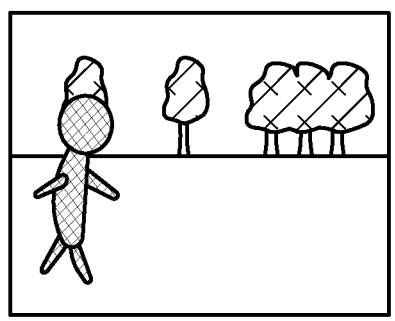
2nd Imaging Data
FIG. 3C
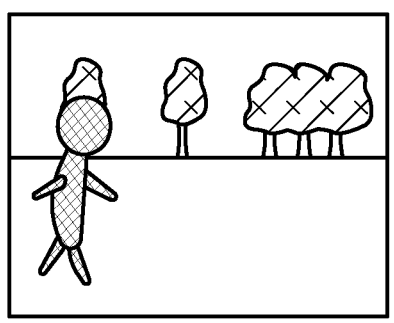
3rd Imaging Data

IMAGING DEVICE, MONITORING DEVICE, AND ELECTRONIC APPLIANCE

BACKGROUND OF THE INVENTION

1. Field of the Invention

One embodiment of the present invention relates to an imaging device, a monitoring device, and an electronic appliance which have a function of taking an image.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a memory device, a method for driving any of them, and a method for manufacturing any of them.

2. Description of the Related Art

Imaging devices are normally incorporated in mobile phones, and have come into widespread use (e.g., Patent Document 1). In particular, CMOS imaging sensors have advantages of low price, high resolution, low power consumption, and the like as compared with CCD image sensors. A CMOS image sensor accounts for the most part of an imaging device.

PATENT DOCUMENT

[Patent Document 1] U.S. Pat. No. 7,046,282

SUMMARY OF THE INVENTION

In the case where a CMOS image sensor is used in a security camera, a system which sounds an alarm when an intruder is detected can be used, for example. Specifically, the following structure is considered: image processing for comparison between imaging data of an image captured when no intruder is present in a monitored area and imaging data of an image of the present time which are obtained with a CMOS image sensor is executed; and when there is a difference therebetween, a trigger signal is generated.

The procedure of the above image processing is as follows: first, data of each pixel in the CMOS image sensor is read out and converted into digital data by A/D conversion; then, the digital data is taken in a computer, and image processing software in the computer is executed. Therefore, to generate the trigger signal, a vast amount of power is consumed by A/D conversion of the data read out from the CMOS image sensor, data transfer for taking a large amount of digital data into the computer, storage/reading of the digital data in/from a memory device in the computer, execution of the image processing software, and the like.

Thus, an object of one embodiment of the present invention is to provide a novel imaging device and the like.

Another object of one embodiment of the present invention is to provide an imaging device or the like having a novel structure which is capable of detecting differences with low power consumption.

Note that the objects of the present invention are not limited to the above objects. The objects described above do not disturb the existence of other objects. The other objects are the ones that are not described above and will be described below. The other objects will be apparent from and can be derived from the description of the specification, the drawings, and the like by those skilled in the art. One embodiment of the present invention is to solve at least one of the aforementioned objects and the other objects.

One embodiment of the present invention is made in view of the above objects and is an imaging device including a plurality of pixels, an analog processing circuit, and a digital processing circuit. In a first mode, difference data between first imaging data in a first state and second imaging data in a second state can be stored in the pixel and can be read out from the pixel. In a second mode, third imaging data in a third state can be stored in the pixel and can be read out from the pixel. In the first mode, the analog processing circuit executes a sum-of-absolute-difference operation on the difference data read from each pixel, and generates a trigger signal when a result of the operation is larger than a predetermined value. In the second mode, the digital processing circuit converts the third imaging data read from each pixel into digital data by A/D conversion. Note that when the trigger signal is generated, the mode of the imaging device is switched from the first mode to the second mode. Furthermore, when a predetermined period of time has passed in the second mode or when a signal for returning the mode of the imaging device to the first mode, the mode of the imaging device is switched from the second mode to the first mode.

Another embodiment of the present invention is made in view of the above objects and is an imaging device including a plurality of pixels, an analog processing circuit, and a digital processing circuit. In a first mode, difference data between first imaging data in a first state and second imaging data in a second state can be stored in the pixel and can be read out from the pixel. In a second mode, third imaging data in a third state can be stored in the pixel and can be read out from the pixel. In the first mode, the analog processing circuit compares a current value corresponding to the difference between the first imaging data and the second imaging data with a reference current value, and generates a trigger signal when a difference is detected. In the second mode, the digital processing circuit converts the third imaging data read from each pixel into digital data by A/D conversion. Note that when the trigger signal is generated, the mode of the imaging device is switched from the first mode to the second mode. Furthermore, when a predetermined period of time has passed in the second mode or when a signal for returning the mode of the imaging device to the first mode, the mode of the imaging device is switched from the second mode to the first mode.

In the above structure, in the first mode, digital processing which consumes a vast amount of power is not performed and only minimum analog processing for generating a trigger signal is performed; therefore, power consumption can be reduced. Furthermore, in the second mode, a cause of the generation of the trigger signal, i.e., a difference from the imaging data in the first mode can be checked in detail by digital processing.

One embodiment of the present invention is an imaging device including a pixel including a photoelectric conversion element and a transistor; an analog processing circuit; and a digital processing circuit. The imaging device operates in a first mode and a second mode. In the first mode, the analog processing circuit detects a difference between first imaging data taken by the pixel and second imaging data taken by the pixel and generates a trigger signal on the basis of the value of the difference. In the second mode, the digital processing circuit converts third imaging data taken by the pixel into digital data. Switching from the first mode to the second mode is performed on the basis of the trigger signal.

The analog processing circuit included in the imaging device of one embodiment of the present invention performs a sum-of-absolute-difference operation of the first imaging data and the second imaging data and generates the trigger signal when a result of the operation is not the same as a predetermined value. Furthermore, the analog processing circuit includes a subtraction circuit, an absolute value circuit, and an adder circuit.

The digital processing circuit included in the imaging device of one embodiment of the present invention includes an A/D converter circuit.

The mode of the imaging device of one embodiment of the present invention is switched from the second mode to the first mode when a predetermined period of time has passed.

According to one embodiment of the present invention, a semiconductor device or the like having a novel structure can be provided.

According to one embodiment of the present invention, an imaging device capable of detecting differences with low power consumption can be provided.

Note that the effects of the present invention are not limited to the above effects. The effects described above do not disturb the existence of other effects. The other effects are the ones that are not described above and will be described below. The other effects will be apparent from and can be derived from the description of the specification, the drawings, and the like by those skilled in the art. One embodiment of the present invention is to have at least one of the aforementioned effects and the other effects. Accordingly, one embodiment of the present invention does not have the aforementioned effects in some cases.

BRIEF DESCRIPTION OF THE DRAWINGS

FIGS. 3A1 to 3C illustrate operations of an imaging device.

DETAILED DESCRIPTION OF THE INVENTION

Figure 1:
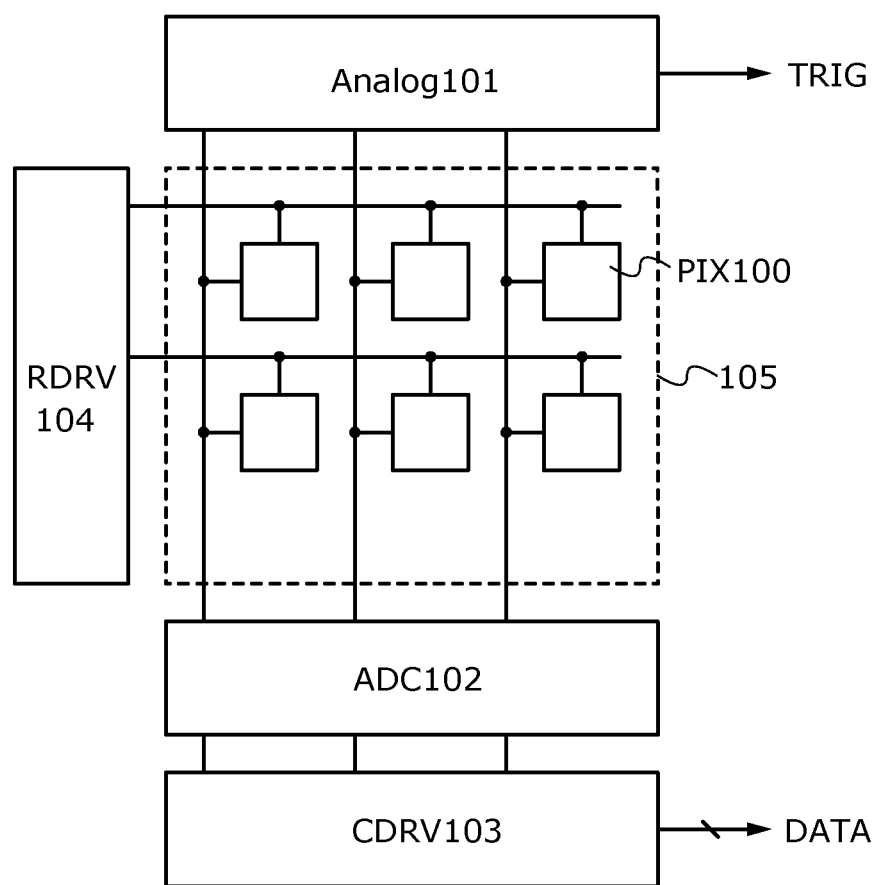
FIG. 1 illustrates the configuration of an imaging device.

Hereinafter, embodiments will be described with reference to drawings. However, the embodiments can be imple-mented with various modes. It will be readily appreciated by those skilled in the art that modes and details can be changed in various ways without departing from the spirit and scope of the present invention. Thus, the present invention should not be interpreted as being limited to the following description of the embodiments.

A transistor is a kind of semiconductor elements and can achieve amplification of current or voltage, switching operation for controlling conduction or non-conduction, or the like. A transistor in this specification includes an insulated-gate field effect transistor (IGFET) and a thin film transistor (TFT).

Note that the position, the size, the range, or the like of each structure illustrated in drawings and the like is not accurately represented in some cases for simplification. Therefore, the disclosed invention is not necessarily limited to the position, the size, the range, or the like disclosed in the drawings and the like.

In this specification and the like, ordinal numbers such as "first", "second", "third", and the like are used in order to avoid confusion among components, and the terms do not limit the components numerically.

Note that in this specification and the like, when it is explicitly described that X and Y are connected, the case where X and Y are electrically connected, the case where X and Y are functionally connected, and the case where X and Y are directly connected are included therein. Accordingly, another element may be interposed between elements having a connection relation shown in drawings and texts, without limiting to a predetermined connection relation, for example, the connection relation shown in the drawings and the texts.

Here, X and Y each denote an object (e.g., a device, an element, a circuit, a line, an electrode, a terminal, a conductive film, a layer, or the like).

For example, in the case where X and Y are electrically connected, one or more elements that enable electrical connection between X and Y (e.g., a switch, a transistor, a capacitor, an inductor, a resistor, a diode, a display element, a light-emitting element, or a load) can be connected between X and Y. A switch is controlled to be on or off. That is, a switch is conducting or not conducting (is turned on or off) to determine whether current flows therethrough or not. Alternatively, the switch has a function of selecting and changing a current path.

For example, in the case where X and Y are functionally connected, one or more circuits that enable functional connection between X and Y (e.g., a logic circuit such as an inverter, a NAND circuit, or a NOR circuit; a signal converter circuit such as a DA converter circuit, an AD converter circuit, or a gamma correction circuit; a potential level converter circuit such as a power supply circuit (e.g., a dc-dc converter, a step-up dc-dc converter, or a step-down dc-dc converter) or a level shifter circuit for changing the potential level of a signal; a voltage source; a current source; a switching circuit; an amplifier circuit such as a circuit that can increase signal amplitude, the amount of current, or the like, an operational amplifier, a differential amplifier circuit, a source follower circuit, or a buffer circuit; a signal generation circuit; a memory circuit; and/or a control circuit) can be connected between X and Y. Note that for example, in the case where a signal output from X is transmitted to Y even when another circuit is provided between X and Y, X and Y are functionally connected.

Note that when it is explicitly described that X and Y are electrically connected, the case where X and Y are electrically connected (i.e., the case where X and Y are connected with another element or another circuit provided therebetween), the case where X and Y are functionally connected (i.e., the case where X and Y are functionally connected with another circuit provided therebetween), and the case where X and Y are directly connected (i.e., the case where X and Y are connected without another element or another circuit provided therebetween) are included therein. That is, when it is explicitly described that "X and Y are electrically connected", the description is the same as the case where it is explicitly only described that "X and Y are connected".

Note that, for example, the case where a source (or a first terminal or the like) of a transistor is electrically connected to X through (or not through) Z1 and a drain (or a second terminal or the like) of the transistor is electrically connected to Y through (or not through) Z2, or the case where a source (or a first terminal or the like) of a transistor is directly connected to one part of Z1 and another part of Z1 is directly connected to X while a drain (or a second terminal or the like) of the transistor is directly connected to one part of Z2 and another part of Z2 is directly connected to Y, can be expressed by using any of the following expressions.

The expressions include, for example, "X, Y, a source (or a first terminal or the like) of a transistor, and a drain (or a second terminal or the like) of the transistor are electrically connected to each other, and X, the source (or the first terminal or the like) of the transistor, the drain (or the second terminal or the like) of the transistor, and Y are electrically connected to each other in this order", "a source (or a first terminal or the like) of a transistor is electrically connected to X, a drain (or a second terminal or the like) of the transistor is electrically connected to Y, and X, the source (or the first terminal or the like) of the transistor, the drain (or the second terminal or the like) of the transistor, and Y are electrically connected to each other in this order", and "X is electrically connected to Y through a source (or a first terminal or the like) and a drain (or a second terminal or the like) of a transistor, and X, the source (or the first terminal or the like) of the transistor, the drain (or the second terminal or the like) of the transistor, and Y are provided to be connected in this order". When the connection order in a circuit configuration is defined by an expression similar to the above examples, a source (or a first terminal or the like) and a drain (or a second terminal or the like) of a transistor can be distinguished from each other to specify the technical scope. Note that these expressions are examples and there is no limitation on the expressions. Here, X, Y, Z1, and Z2 each denote an object (e.g., a device, an element, a circuit, a wiring, an electrode, a terminal, a conductive film, and a layer).

Even when independent components are electrically connected to each other in a circuit diagram, one component has functions of a plurality of components in some cases. For example, when part of a wiring also functions as an electrode, one conductive film functions as the wiring and the electrode. Thus, "electrical connection" in this specification includes in its category such a case where one conductive film has functions of a plurality of components.

Note that the layout of circuit blocks in a block diagram in a drawing specifies the positional relation for description. Thus, even when a drawing shows that different functions are achieved in different circuit blocks, an actual circuit block may be configured so that the different functions are achieved in the same circuit block. The functions of circuit blocks in diagrams are specified for description, and even in the case where one circuit block is illustrated, blocks might be provided in an actual circuit block so that processing performed by one circuit block is performed by a plurality of circuit blocks.

In this specification, the term "parallel" indicates that the angle formed between two straight lines is greater than or equal to −10° and less than or equal to 10°, and accordingly also includes the case where the angle is greater than or equal to −5° and less than or equal to 5°. The term "perpendicular" indicates that the angle formed between two straight lines is greater than or equal to 80° and less than or equal to 100°, and accordingly also includes the case where the angle is greater than or equal to 85° and less than or equal to 95°.

In this specification, trigonal and rhombohedral crystal systems are included in a hexagonal crystal system.

Embodiment 1

A configuration of an imaging device of one embodiment of the present invention is described with reference to FIG. 1. The imaging device of one embodiment of the present invention includes a pixel portion 105 including a plurality of pixels 100 (PIX 100) arranged in matrix, an analog processing circuit 101 (Analog 101), an A/D converter circuit 102 (ADC 102), which is a digital processing circuit, a column driver 103 (CDRV 103), and a row driver 104 (RDRV 104).

The pixels 100 each include a photodiode having a function of a photoelectric conversion element, and at least one transistor. The analog processing circuit 101 executes analog data processing on imaging data which is analog data output from each pixel 100. Specifically, the analog processing circuit 101 executes a sum-of-absolute-difference operation on imaging data output from each pixel 100. In the case where the obtained result of the operation is different from a predetermined value, a trigger signal (represented as TRIG) is generated. The A/D converter circuit 102 converts the imaging data output from each pixel 100 into digital data by A/D conversion. The pieces of A/D converted digital data are sequentially extracted as data DATA to the outside by the column driver 103. As each of the column driver 103 and the row driver 104, any of a variety of circuits such as a decoder and a shift register is used.

Next, operations of the imaging device of one embodiment of the present invention are described with reference to FIG. 2 and FIGS. 3A1 to 3C.

Figure 2:
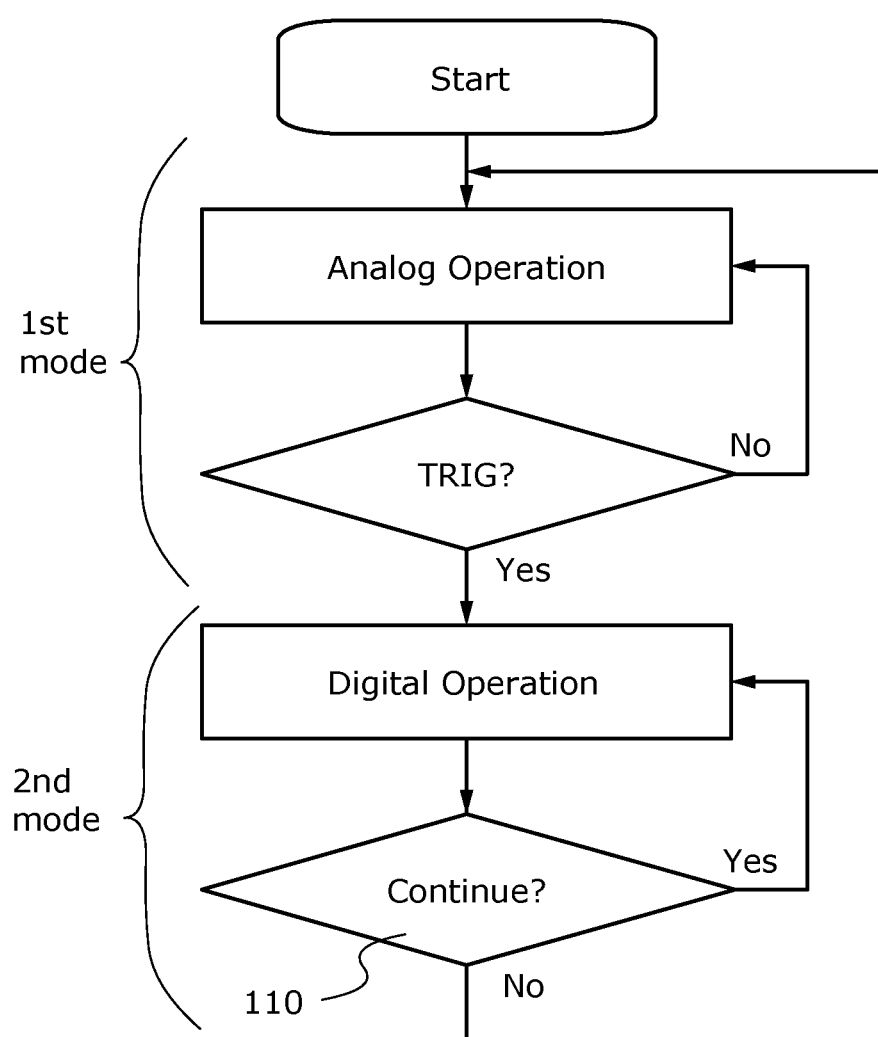
FIG. 2 illustrates operations of an imaging device.

First, an operation of a first mode is described (see FIG. 2). In the first mode, a sum-of-absolute-difference operation, which is analog processing, is performed in the analog processing circuit 101, so that a difference between first imaging data and second imaging data which are taken by the pixel 100 is detected. As a result of the analog processing, when there is no difference between the first imaging data and the second imaging data, i.e., when a trigger signal is not generated, the analog processing continues. In contrast, when there is a difference between the first imaging data and the second imaging data as a result of the analog processing, i.e., when a trigger signal is generated, the mode is switched to a second mode.

As another operation, in the first mode, comparison of a current value corresponding to the difference in imaging data with a reference current value is performed in the analog processing circuit 101, whereby a difference between the first imaging data and the second imaging data which are taken by the pixel 100 is detected. When the difference between the first imaging data and the second imaging data is too small to be detected by the analog processing, i.e., when a trigger signal is not generated, the analog processing continues. In contrast, when there is a difference between the first imaging data and the second imaging data as a result of the analog processing, i.e., when a trigger signal is generated, the mode is switched to the second mode.

For example, in the case where both the first imaging data and the second imaging data are data of an image of a clump of trees (see FIGS. 3A1 and 3A2), the difference therebetween is zero. Thus, a trigger signal is not generated. In contrast, in the case where the first imaging data is data of an image of a clump of trees (see FIG. 3B1) and the second imaging data is data of an image of a clump of trees and a person (see FIG. 3B2), the difference therebetween is not zero, and a trigger signal is generated accordingly. In response to the generation of the trigger signal, the mode of the imaging device is switched from the first mode to the second mode. Note that in the drawings, the first imaging data and the second imaging data show the same scenery but differ in time of taking the image. Therefore, the first imaging data may be represented as imaging data in a first state, and the second imaging data may be represented as imaging data in a second state.

Then, an operation of the second mode is described (see FIG. 2). In the second mode, third imaging data taken by the pixel 100 is converted into digital data by A/D conversion. For example, in the case where the third imaging data is data of an image of a clump of trees and a person (see FIG. 3C), the third imaging data is converted into digital data and details of the data are analyzed, whereby detailed information on the person in the data can be obtained. Note that for the analysis of the imaging data, digital processing using image processing software of a computer is used.

Next, an operation for switching the mode from the second mode to the first mode is described (see Step 110 in FIG. 2). This is executable by providing conditions in advance. Examples of the conditions include passage of a predetermined period of time and input of a control signal for terminating the digital processing. When the conditions are satisfied, the mode is switched from the second mode to the first mode.

Since digital processing, which consumes a vast amount of power, is not performed and only minimum analog processing for generating a trigger signal is performed in the first mode, the power consumption can be reduced in the imaging device of one embodiment of the present invention having the above configuration. Furthermore, in the second mode, a cause of generation of a trigger signal, i.e., the difference between the first imaging data and the second imaging data can be checked in detail by digital processing.

Embodiment 2

A configuration of the pixel 100 included in the imaging device of one embodiment of the present invention is described with reference to FIG. 4A. The pixel 100 includes a transistor 111, a transistor 112, a transistor 113, a transistor 114, a transistor 115, a capacitor 121, a capacitor 122, and a photodiode 123. The pixel 100 is supplied with potentials from a power supply line VPD, a power supply line VPR, a power supply line VC, a power supply line VFR, and a power supply line VO; and supplied with control signals from a signal line TX, a signal line PR, a signal line FR, and a signal line SEL. Imaging data of the pixel 100 is output to a signal line OUT. Charge corresponding to the imaging data is accumulated in a charge retention node FD1. Here, the capacitance value of the capacitor 121 is preferably larger than the total capacitance value of the capacitor 122 and the gate capacitance of the transistor 114.

A gate of the transistor 111 is electrically connected to the signal line TX, one of a source and a drain thereof is electrically connected to one terminal of the photodiode 123, and the other of the source and the drain thereof is electrically connected to one of a source and a drain of the transistor 112. A gate of the transistor 112 is electrically connected to the signal line PR, and the other of the source and the drain thereof is electrically connected to the power supply line VPR. A gate of the transistor 113 is electrically connected to the signal line FR, one of a source and a drain thereof is electrically connected to one electrode of the capacitor 122, and the other of the source and the drain thereof is electrically connected to the power supply line VFR. A gate of the transistor 114 is electrically connected to the one electrode of the capacitor 122, one of a source and a drain thereof is electrically connected to the power supply line VO, and the other of the source and the drain thereof is electrically connected to one of a source and a drain of the transistor 115. A gate of the transistor 115 is electrically connected to the signal line SEL, and the other of the source and the drain thereof is electrically connected to the signal line OUT. One electrode of the capacitor 121 is electrically connected to the other of the source and the drain of the transistor 111 and the one of the source and the drain of the transistor 112, and the other electrode of the capacitor 121 is electrically connected to the one electrode of the capacitor 122 and the one of the source and the drain of the transistor 113. The other electrode of the capacitor 122 is electrically connected to the power supply line VC. The other terminal of the photodiode 123 is electrically connected to the power supply line VPD.

Figure 4B:
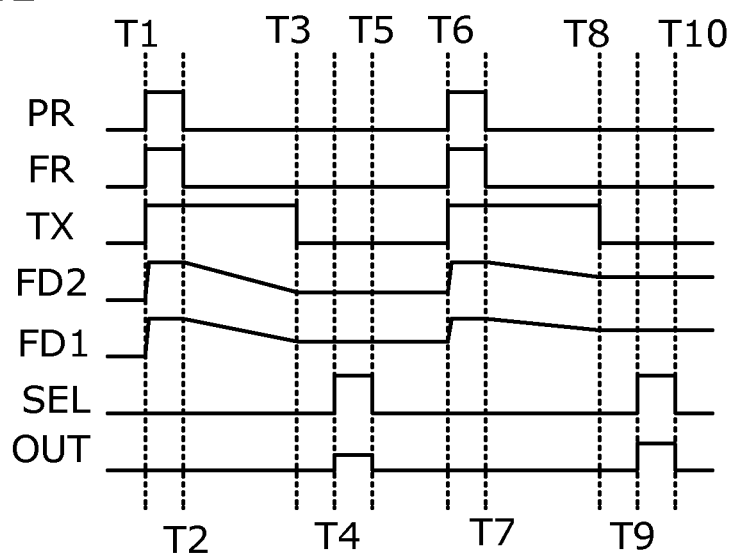
Figure 5:
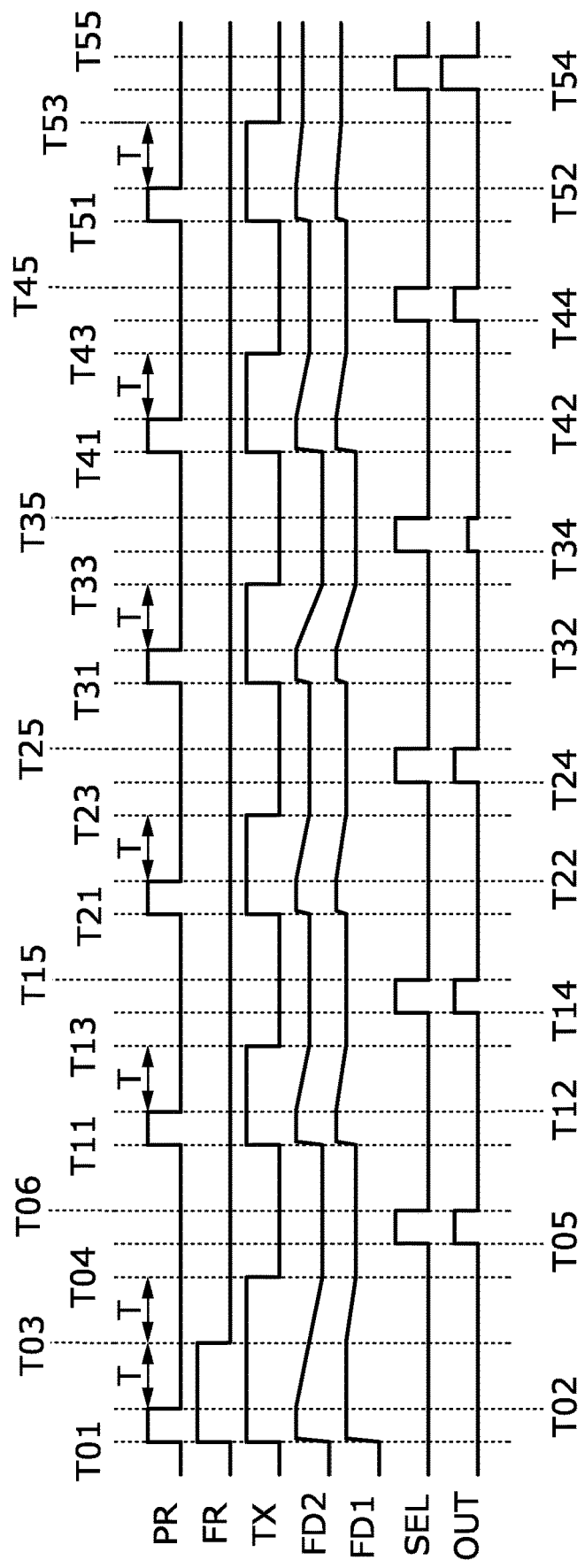
FIG. 5 illustrates operations of an imaging device.

Operations of the pixel 100 are described with reference to FIG. 4B and FIG. 5. Here, the power supply line VPD is set at a low potential, the power supply line VPR is set at a high potential, the supply line VC is set at a low potential, the power supply line VFR is set at a high potential, and the power supply line VO is set at a high potential, for example. First, an operation in the second mode is described with reference to FIG. 4B.

From Time T1 to Time T2, the signal line PR, the signal line FR, and the signal line TX are set at "H". In this period, the potential of the charge retention node FD1 is set to the potential of the power supply line VFR (represented as V1), and the potential of a node FD2 is set to the potential of the power supply line VPR (represented as V2). From Time T2 to Time T3, the signal line PR and the signal line FR are set at "L", and the signal line TX is set at "H". In this period, the potential of the node FD2 decreases in response to light with which the photodiode 123 is irradiated. Here, when a decreased amount of voltage in the node FD2 is represented as $\Delta V2$, the potential of the node FD2 is represented as $V2-\Delta V2$. The potential of the charge retention node FD1 also decreases owing to capacitance coupling of the capacitor 121 (capacitance value C1), and the combined capacitance of the capacitor 122 (capacitance value C2) and the gate capacitance of the transistor 114 (capacitance value Cg). Here, when a decreased amount of charge in the charge retention node FD1 is represented as $\Delta V1$, $\Delta V1 = \Delta V \cdot C1/(C1+C2+Cg) = \Delta V2 \cdot \alpha$, and the potential of the charge retention node FD1 is represented as $V1-\Delta V1$. Note that an increase in the intensity of the light with which the photodiode 123 is irradiated reduces the potential of the node FD2. Furthermore, the potential of the charge retention node FD1 is also reduced. From Time T4 to Time T5, the signal line SEL is set at "H". In this period, a signal corresponding to the imaging data is output to the signal line OUT depending on the potential of the charge retention node FD1. Note that a decrease in the potential of the charge retention node FD1 reduces the potential of the signal line OUT. That is, an increase in the intensity of the light with which the photodiode 123 is irradiated reduces the potential of the signal line OUT. A period from Time T6 to Time T10 can be explained in a manner similar to that for the period from Time T1 to Time T5.

Next, an operation in the first mode is described with reference to FIG. 5.

A period from Time T01 to Time T06 corresponds to a period for obtaining first imaging data in the first state. From Time T01 to Time T02, the signal line PR, the signal line FR, and the signal line TX are set at "H". In this period, the potential of the charge retention node FD1 is set to the potential of the power supply line VFR (V1), and the potential of the node FD2 is set to the potential of the power supply line VPR (V2). From Time T02 to Time T03, the signal line PR is set at "L", the signal line FR is set at "H", and the signal line TX is set at "H". In this period, the potential of the node FD2 decreases in response to light with which the photodiode 123 is irradiated. Here, when a decreased amount of voltage in the node FD2 is represented as $\Delta V2$, the potential of the node FD2 is represented as $V2-\Delta V2$. Note that an increase in the intensity of the light with which the photodiode 123 is irradiated reduces the potential of the node FD2. The potential of the charge retention node FD1 does not change. From Time T03 to Time T04, the signal line PR and the signal line FR are set at "L", and the signal line TX is set at "H". Note that an interval between Time T02 and Time T03 and an interval between Time T03 and Time T04 are equal and denoted by T. In the period, the potential of the node FD2 decreases in response to the light with which the photodiode 123 is irradiated to be $V2-2\cdot\Delta V2$. Furthermore, the potential of the charge retention node FD1 also decreases owing to capacitance coupling of the capacitor 121, the capacitor 122, and the gate capacitance of the transistor 114. Here, when the decreased amount of voltage in the charge retention node FD1 is represented as $\Delta V1$, $\Delta V1=\Delta V2\cdot\alpha$, and the potential of the charge retention node FD1 is represented as $V1-\Delta V1$. Note that an increase in the intensity of the light with which the photodiode 123 is irradiated reduces the potential of the node FD2. In addition, the potential of the charge retention node FD1 is also reduced. Note that although the interval between Time T02 and Time T03 and the interval between Time T03 and Time T04 are equal, i.e., T in the above description, essence of one embodiment of the present invention is to set a decreased amount of voltage in the node FD in the period from Time T02 to Time T03 equal to that in the period from Time T03 to Time T04. Therefore, to satisfy the condition, it is preferable that the interval between Time T02 and Time T03 and the interval between Time T03 and Time T04 be adjusted appropriately. From Time T05 to Time T06, the signal line SEL is set at "H". In the period, a signal corresponding to the imaging data is output to the signal line OUT depending on the potential of the charge retention node FD1. Note that a decrease in the potential of the charge retention node FD1 reduces the potential of the signal line OUT. That is, an increase in the intensity of the light with which the photodiode 123 is irradiated reduces the potential of the signal line OUT.

A period from Time T11 to Time T15 corresponds to a period for obtaining second imaging data in the second state. In particular, the period corresponds to a period in which a difference between the first imaging data and the second imaging data is zero. From Time T11 to Time T12, the signal line PR is set at "H", the signal line FR is set at "L", and the signal line TX is set at "H". In this period, the potential of the node FD2 is set to the potential of the power supply line VPR (V2). That is, the potential is increased by a decreased amount of voltage in the period from Time T02 to Time T04 ($2\cdot\Delta V2$). On the other hand, although the potential of the charge retention node FD1 also increases owing to the capacitance coupling of the capacitor 121, the capacitor 122, and the gate capacitance of the transistor 114, the increased amount of potential ($2\cdot\Delta V1$) is equivalent to twice the decreased amount of voltage in the period from Time 03 to Time T04. That is the increased amount of potential is a potential ($V1+\Delta V1$), which is equivalent to the sum of the potential of the power supply line VFR (V1) and the decreased amount of voltage in the period from Time T03 to Time T 04 ($\Delta V1$). From Time T12 to Time T13, the signal line PR and the signal line FR are set at "L", and the signal line TX is set at "H". In this period, the potential of the node FD2 decreases in response to light with which the photodiode 123 is irradiated. Furthermore, the potential of the charge retention node FD1 also decreases owing to capacitance coupling of the capacitor 121, the capacitor 122, and the gate capacitance of the transistor 114. Note that an increase in the intensity of the light with which the photodiode 123 is irradiated reduces the potential of the node FD2. In addition, the potential of the charge retention node FD1 is also reduced.

Assuming that an interval between Time T12 and Time T13 is T and the intensity of light with which the photodiode 123 is irradiated is the same as that from Time T02 to Time T04, the decreased amount of voltage in the node FD2 in the period from Time T12 to Time T13 is equal to the decreased amount of voltage $\Delta V2$ in the period from Time T03 to Time T04. Furthermore, the decreased amount of voltage in the charge retention node FD1 in the period from Time T12 to Time T13 is equal to the decreased amount of voltage $\Delta V1$ in the period from Time T03 to Time T04. Thus, the potential of the charge retention node FD1 becomes V1, which indicates that the difference between the first imaging data and the second imaging data is zero.

From Time T14 to Time T15, the signal line SEL is set at "H". In this period, a signal corresponding to the imaging data is output to the signal line OUT depending on the potential of the charge retention node FD1. Note that the potential of the signal is a potential at which the difference between the first image data and the second image data is zero.

A period from Time T21 to Time T25 corresponds to a period for obtaining the second imaging data in the second state. In particular, in a manner similar to that of the period from Time T11 to Time T15, the period corresponds to a period in which a difference between the first imaging data and the second imaging data is zero.

A period from Time T31 to Time T35 corresponds to a period for obtaining second imaging data in the second state. In particular, the period corresponds to a period in which a difference between the first imaging data and the second imaging data is finite (negative). From Time T31 to Time T32, the signal line PR is set at "H", the signal line FR is set at "L", and the signal line TX is set at "H". In this period, the potential of the node FD2 is set to the potential of the power supply line VPR (V2). That is, the potential is increased by a decreased amount of voltage in the period from Time T12 to Time T13 ($\Delta V2$). On the other hand, although the potential of the charge retention node FD1 also increases owing to the capacitance coupling of the capacitor 121, the capacitor 122, and the gate capacitance of the transistor 114, the increased amount of potential ($\Delta V1$) is equivalent to the decreased amount of voltage in the period from Time 12 to Time T13. That is the increased amount of potential is a potential (V1+$\Delta V1$), which is equivalent to the sum of the potential of the power supply line VFR (V1) and the decreased amount of voltage in the period from Time T03 to Time T 04 ($\Delta V1$). From Time T32 to Time T33, the signal line PR and the signal line FR are set at "L", and the signal line TX is set at "H". In this period, the potential of the node FD2 decreases in response to light with which the photodiode 123 is irradiated. Furthermore, the potential of the charge retention node FD1 also decreases owing to capacitance coupling of the capacitor 121, the capacitor 122, and the gate capacitance of the transistor 114. Note that the intensity of light with which the photodiode 123 is irradiated in the period from Time T32 to Time T33 is assumed to be higher than that in the period from Time T12 to Time T13. Here, when the interval between Time T32 and Time T33 is T, a decreased amount of voltage in the node FD2 ($\Delta V2'$) is larger than the decreased amount of voltage ($\Delta V2$) in the period from Time T12 to Time T13 ($\Delta V2'>\Delta V2$). Furthermore, the decreased amount of voltage in the charge retention node FD1 ($\Delta V1'=\Delta V2'\cdot\alpha$) is also larger than the decreased amount of voltage ($\Delta V1$) in the period from Time T12 to Time T13 ($\Delta V1'>\Delta V1$). As a result, the potential of the charge retention node FD1 (V1+$\Delta V1-\Delta V1'$) is lower than the potential of the supply line VFR (V1), which indicates that the difference between the first imaging data and the second imaging data is finite (negative).

From Time T34 to Time T35, the signal line SEL is set at "H". In this period, a signal corresponding to the imaging data is output to the signal line OUT depending on the potential of the charge retention node FD1. Note that the potential of the signal is a potential which is lower than the potential of the signal in a period from Time T24 to Time T25 and at which the difference between the first image data and the second image data is finite (negative).

A period from Time T41 to Time T45 corresponds to a period for obtaining second imaging data in the second state. In particular, the period corresponds to a period in which a difference between the first imaging data and the second imaging data becomes zero again. From Time T41 to Time T42, the signal line PR is set at "H", the signal line FR is set at "L", and the signal line TX is set at "H". In this period, the potential of the node FD2 is set to the potential of the power supply line VPR (V2). That is, the potential is increased by a decreased amount of voltage in the period from Time T32 to Time T33 ($\Delta V2'$). On the other hand, although the potential of the charge retention node FD1 also increases owing to the capacitance coupling of the capacitor 121, the capacitor 122, and the gate capacitance of the transistor 114, the increased amount of potential ($\Delta V1'$) is equivalent to the decreased amount of voltage in the period from Time 32 to Time T33. That is the increased amount of potential is a potential (V1+$\Delta V1$), which is equivalent to the sum of the potential of the power supply line VFR (V1) and the decreased amount of voltage in the period from Time T03 to Time T04 ($\Delta V1$). From Time T42 to Time T43, the signal line PR and the signal line FR are set at "L", and the signal line TX is set at "H". In this period, the potential of the node FD2 decreases in response to light with which the photodiode 123 is irradiated. Furthermore, the potential of the charge retention node FD1 also decreases owing to capacitance coupling of the capacitor 121, the capacitor 122, and the gate capacitance of the transistor 114. Note that an increase in the intensity of the light with which the photo-diode 123 is irradiated reduces the potential of the node FD2. Furthermore, the potential of the charge retention node FD1 is also reduced. Here, when the interval between Time T42 and Time T43 is T and the intensity of light with which the photodiode 123 is irradiated is the same as that from Time T02 to Time T04, a decreased amount of voltage in the node FD2 is equal to the decreased amount of voltage ($\Delta V2$) in the period from Time T03 to Time T04. Furthermore, the decreased amount of voltage in the charge retention node FD1 is also equal to the decreased amount of voltage ($\Delta V1$) in the period from Time T03 to Time T04. Therefore, the potential of the charge retention node FD1 is V1, which indicates that the difference between the first imaging data and the second imaging data is zero. From Time T44 to Time T45, the signal line SEL is set at "H". In this period, a signal corresponding to the imaging data is output to the signal line OUT depending on the potential of the charge retention node FD1. Note that the potential of the signal is a potential at which the difference between the first image data and the second image data is zero.

A period from Time T51 to Time T55 corresponds to a period for obtaining second imaging data in the second state. In particular, the period corresponds to a period in which a difference between the first imaging data and the second imaging data is finite (positive). From Time T51 to Time T52, the signal line PR is set at "H", the signal line FR is set at "L", and the signal line TX is set at "H". In this period, the potential of the node FD2 is set to the potential of the power supply line VPR (V2). That is, the potential is increased by a decreased amount of voltage in the period from Time T42 to Time T43 ($\Delta V2$). On the other hand, although the potential of the charge retention node FD1 also increases owing to the capacitance coupling of the capacitor 121, the capacitor 122, and the gate capacitance of the transistor 114, the increased amount of potential ($\Delta V1$) is equivalent to the decreased amount of voltage in the period from Time 42 to Time T43. That is the increased amount of potential is a potential (V1+$\Delta V1$), which is equivalent to the sum of the potential of the power supply line VFR (V1) and the decreased amount of voltage in the period from Time T03 to Time T04 ($\Delta V1$).

From Time T52 to Time T53, the signal line PR and the signal line FR are set at "L", and the signal line TX is set at "H". In this period, the potential of the node FD2 decreases in response to light with which the photodiode 123 is irradiated. Furthermore, the potential of the charge retention node FD1 also decreases owing to capacitance coupling of the capacitor 121, the capacitor 122, and the gate capacitance of the transistor 114. Note that the intensity of light with which the photodiode 123 is irradiated in the period from Time T52 to Time T53 is assumed to be lower than that in the period from Time T12 to Time T13.

Here, when the interval between Time T52 and Time T53 is T, a decreased amount of voltage in the node FD2 ($\Delta V2''$) is smaller than the decreased amount of voltage ($\Delta V2$) in the period from Time T12 to Time T13 ($\Delta V2''<\Delta V2$). Furthermore, the decreased amount of voltage in the charge retention node FD1 ($\Delta V1''=\Delta V2''\cdot\alpha$) is also smaller than the decreased amount of voltage ($\Delta V1$) in the period from Time T12 to Time T13 ($\Delta V1''<\Delta V1$). Therefore, the potential of the charge retention node FD1 is (V1+$\Delta V1-\Delta V1''$) is higher than the potential of the supply line VFR (V1), which indicates that the difference between the first imaging data and the second imaging data is finite (positive).

From Time T54 to Time T55, the signal line SEL is set at "H". In this period, a signal corresponding to the imaging data is output to the signal line OUT depending on the potential of the charge retention node FD1. Note that the potential of the signal is a potential which is higher than the potential of the signal in the period from Time T24 to Time T25 and at which the difference between the first image data and the second image data is finite (positive).

Note that the first imaging data is output from Time T05 to T06 in this embodiment; however, in the case where it is enough to obtain difference data between the first imaging data and the second imaging data, that is, in the case where the first imaging data need not be output, the operations from Time T03 to Time T06 can be skipped. Operations in which the operations from Time T03 to Time T06 are skipped are as follows. When the signal line PR is set at "H", the signal line FR is set at "L", and the signal line TX is set at "H" from Time T11 to Time T12, the potential of the node FD2 is changed from the potential V2–ΔV2 at Time T03 to the potential V2. Furthermore, the potential of the charge retention node FD1 is increased from the potential V1 at the Time T03 to the potential V1+ΔV1. For operations after Time T12, the above description can be referred to.

This embodiment can be implemented in combination with any of the other embodiments as appropriate.

Embodiment 3

Figure 6:
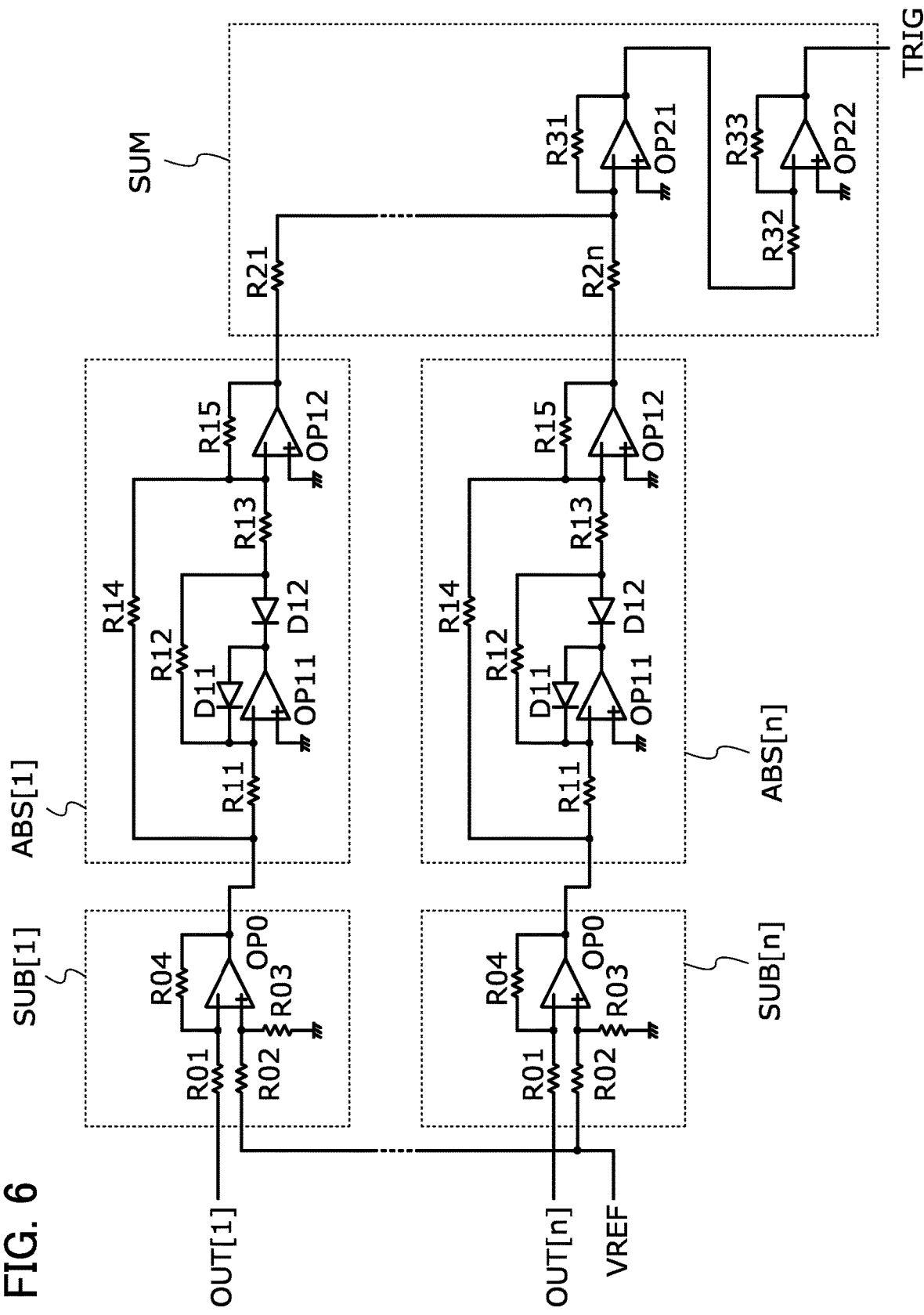
FIG. 6 illustrates the configuration of an imaging device.

A configuration example of the analog processing circuit included in the imaging device of one embodiment of the present invention is described with reference to FIG. 6. The analog processing circuit includes subtraction circuits SUB[1] to SUB[n], absolute value circuits ABS[1] to ABS[n], and an adder circuit SUM.

The subtraction circuits SUB[1] to SUB[n] perform subtraction between potentials of signal lines OUT[1] to OUT[n] of pixels and a reference potential VREF, respectively. The reference potential VREF can be generated by providing a dummy circuit equivalent to the pixel 100 and using the potential of its signal line OUT when the potential of its charge retention node FD1 is VFR. The subtraction circuits SUB[1] to SUB[n] each include an OP amplifier OP0 and resistors R01 to R04. Here, in the subtraction circuit SUB[1], the potential of the signal line OUT and the potential of VREF are represented as V10 and V20, respectively. In addition, the resistance values of the resistors R01 to R04 are set so as to satisfy the following formulae (1) and (2).

$$R01=R04 \quad (1)$$

$$R04/R01=R03/R02 \quad (2)$$

Thus, the output of the subtraction circuit SUB[1] satisfies the following formula (3).

$$V0=V20-V10 \quad (3)$$

Note that the same applies to the outputs of the subtraction circuits SUB[2] to SUB[n].

The absolute value circuits ABS[1] to ABS[n] output the absolute values of the outputs of the subtraction circuits SUB[1] to SUB[n], respectively. The absolute value circuits ABS[1] to ABS[n] each include an OP amplifier OP11, an OP amplifier OP12, resistors R11 to R15, a diode D11, and a diode D12. Here, in the absolute value circuit ABS[1], the potential of an input signal is represented as V10', and the resistance values are set so that R11=R12 and R13×2=R14=R15, whereby the output of the absolute value circuit ABS[1] is equal to V10'.

Note that the same applies to the outputs of the absolute value circuit ABS[2] to ABS[n].

The adder circuit SUM outputs the sum of the outputs of the absolute value circuits ABS[1] to ABS[n]. The adder circuit SUM includes an OP amplifier OP21, an OP amplifier OP22, resistors R21 to R2n, and resistors R31 to R33. Here, when the potentials of the outputs of the absolute value circuits ABS[1] to ABS[n] are represented as V10" to Vn0", respectively, and the resistance values are set so that R21= . . . =R2n=R31 and R32=R33, the output of the adder circuit SUM is equal to V10"+ . . . +Vn0". This is regarded as a trigger signal TRIG when the first imaging data is the same as the second imaging data, TRIG=0. In contrast, when the first imaging data is different from the second imaging data, TRIG=1.

The above configuration makes it possible to provide an imaging device capable of detecting differences with low power consumption.

This embodiment can be implemented in combination with any of the other embodiments as appropriate.

Embodiment 4

Figure 7:
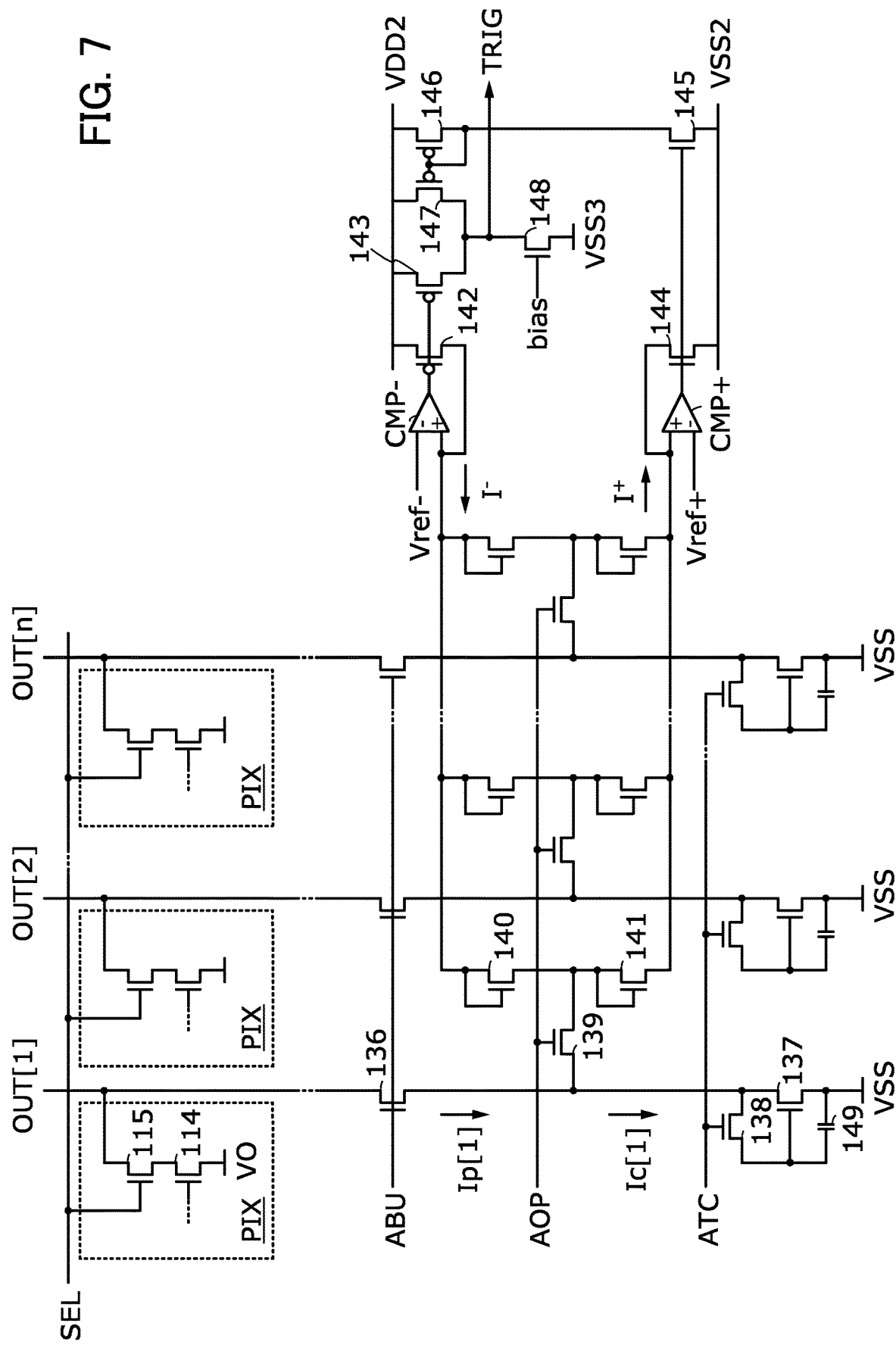
FIG. 7 illustrates the configuration of an imaging device.

A configuration example of the analog processing circuit included in the imaging device of one embodiment of the present invention is described with reference to FIG. 7. The analog processing circuit includes transistors 136, 137, 138, 139, 140, 141, 142, 143, 144, 145, 146, 147, and 148, a capacitor 149, a comparator CMP+, and a comparator CMP−. The potential of a reference potential line Vref+ and the potential of a reference potential supply line Vref− are set appropriately.

Figure 8:
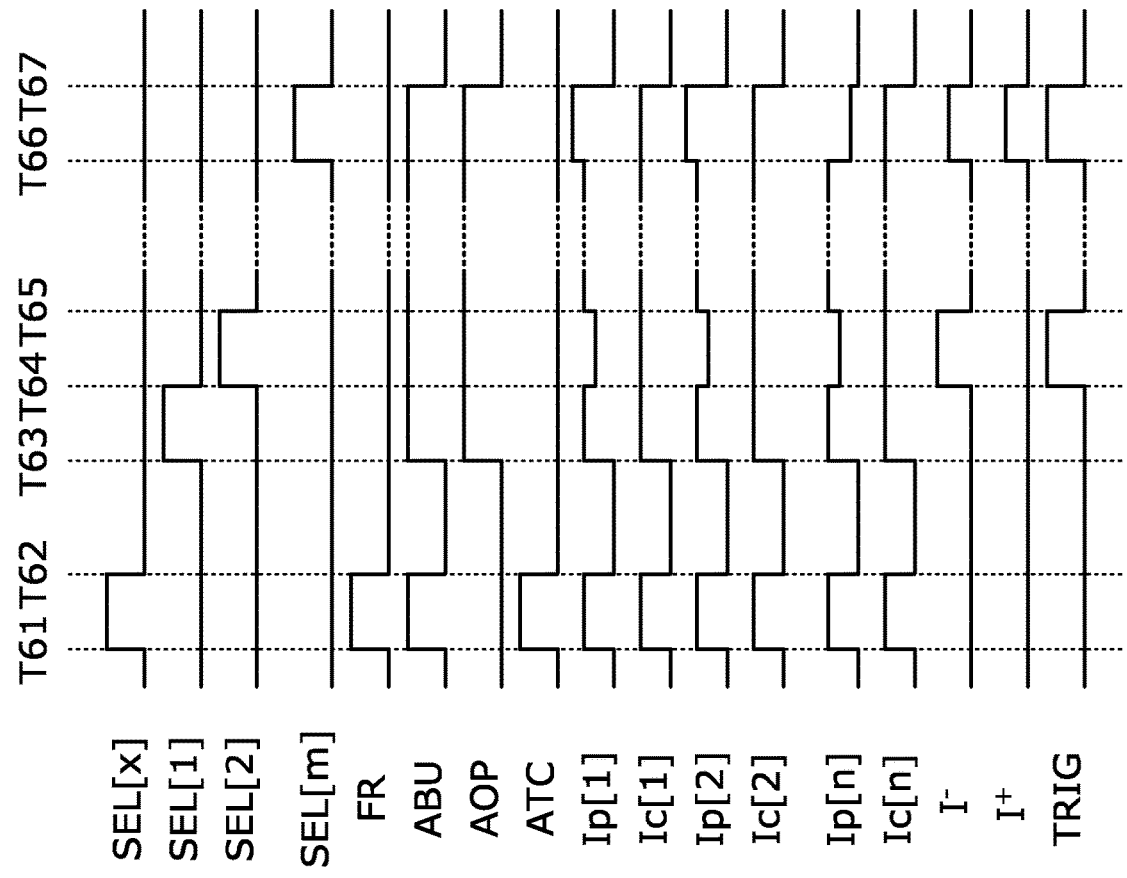
FIG. 8 illustrates operations of an imaging device.

FIG. 8 is a timing chart showing operations of the analog processing circuit.

From Time T61 to Time T62, a signal line ABU is set at "H", a signal line AOP is set at "L", and a signal line ATC is set at "H". Furthermore, the signal line FR and a signal line SEL[x] are set at "H". Note that the signal line SEL[x] is the signal line SEL in an arbitrary row (the x-th row, x is a natural number less than or equal to m). At this time a current supplied to the signal line OUT[y] in a y-th column (y is a natural number less than or equal to n) is equal to the amount of current at the time when the gate potential of the transistor 114 in each pixel PIX in the x-th row is VFR, i.e., an amount of current I0[y] at the time when the difference between imaging data in an initial frame and imaging data in a current frame is zero. The amount of current I0[y] may be referred also as a reference current amount (of the y-th column). Although the current amounts I0[1] to I0[n], each corresponding to the reference current amount of each column, are not always equal, each value of the current amounts I0[1] to I0[n] does not directly affect the operation of the analog processing circuit as shown below. Accordingly, each of the current amounts I0[1] to I0[n] is written as a current amount I0 hereinafter.

Currents Ip[1] to Ip[n] flowing through the transistors 136 are equal to the amount of current J0, and currents Ic[1] to Ic[n] are also equal to the amount of current I0. Furthermore, a current flowing to the transistor 137 in which the drain and the gate are connected each other through the transistor 138 is equal to the amount of current I0. In particular, a potential charged in the capacitor 149 is set to a potential corresponding to a gate voltage which is necessary for the amount of current J0 to flow.

From Time T63 to Time T64, the signal line ABU is set at "H", the signal line AOP is set at "H", the signal line ATC is set at "L", and the signal line SEL[1] is set at "H". In the period, a current corresponding to difference data of each pixel in the first row is supplied to each of the signal lines OUT[1] to OUT[n] in the respective columns. Here, when the difference data of each pixel in the first row is zero, the currents supplied to the signal lines OUT[1] to OUT[n] in the respective columns, the currents Ip[1] to Ip[n] flowing through the transistors 136, and the currents Ic[1] to Ic[n] are equal to the amount of current I0.

From Time T64 to Time T65, the signal line ABU is set at "H", the signal line AOP is set at "H", the signal line ATC is set at "L", and the signal line SEL[2] is set at "H". In the period, a current corresponding to difference data of each pixel in the second row is supplied to each of the signal line OUT[1] to OUT[n] in the respective columns. Here, when the difference data of each pixel in the second row is finite (negative) and the current supplied to the signal lines OUT[y] in the y-th column is represented as (I0−ΔIy), the current Ip[y] flowing through the transistors 136 of the y-th column are equal to (I0−ΔIy), and the currents Ic[y] are equal to the amount of current I0; therefore, a current ΔIy flows through the transistor 139 and the transistor 140 of the y-th column.

Here, in order that the currents ΔI1 to ΔIn flow in the transistor 140 in the corresponding columns, a current I⁻ corresponding to the sum of them needs to be supplied. Here, owing to the comparator CMP− and the transistor 142, the current I⁻ is supplied. That is, in the case where the sum of the current flowing in the transistor 140 in each column is smaller (larger) than the current I⁻, the potential of a + terminal of the comparator CMP− decreases (increases), and thus, the output of the comparator CMP− decreases (increases). That is, the gate voltage of the transistor 142 decreases (increases); as a result, it becomes possible to supply a larger (smaller) current I⁻.

Furthermore, since a potential which is equal to the potential of the gate of the transistor 142 is applied to the transistor 143, a current n1·I⁻ obtained by multiplying the current I⁻ by n1, the W/L ratio of the transistor 143 to the transistor 142, flows in the transistor 143. Furthermore, owing to a buffer formed using the transistor 148 and the transistor 143, the signal TRIG is set at "H". Note that a bias voltage bias is applied to the gate of the transistor 148.

From Time T66 to Time T67, the signal line ABU is set at "H", the signal line AOP is set at "H", the signal line ATC is set at "L", and the signal line SEL[m] is set at "H". In the period, a current corresponding to difference data of each pixel in the m-th row is supplied to each of the signal lines OUT[1] to OUT[n] in the respective columns. Here, when the difference data of each pixel in the m-th row is finite (positive) in the first column, finite (positive) in the second column, finite (negative) in the n-th column, and zero in other columns, and the currents supplied to the signal line OUT[1], the signal line OUT[2], and the signal line OUT[n] in the respective columns are represented as (I0+ΔI1), (I0+ΔI2), and (I0−ΔIn), respectively, the current Ip[1], the current Ip[2], and the current Ip[n] flowing through the transistors 136 are equal to (I0+ΔI1), (I0+ΔI2), and (I0−ΔIn), respectively, and the currents Ic[1] to Ic[n] are equal to the amount of current I0. As a result, currents ΔI1 and ΔI2 flow through the transistors 139 and the transistors 140 in the first and second columns, and a current ΔIn flows through the transistor 139 and the transistor 141 in the n-th column.

Here, in order that the currents ΔI1 and ΔI2 flow in the transistors 140 in the first and second columns, a current I⁻=ΔI1+ΔI2 corresponding to the sum of the currents ΔI1 and ΔI2 needs to be supplied. Here, owing to the comparator CMP− and the transistor 142, the current I⁻ is supplied. That is, in the case where the current flowing in the transistor 140 in each column is smaller (larger) than the current ΔI, the potential of the + terminal of the comparator CMP− decreases (increases), and thus, the output of the comparator CMP− decreases (increases). That is, the gate voltage of the transistor 142 decreases (increases); as a result, it becomes possible to supply a larger (smaller) current F.

Here, in order that the current ΔIn flows in the transistor 141 in the n-th column, a current I⁺=ΔIn needs to be supplied. Here, owing to the comparator CMP− and the transistor 144, the current r can flow. That is, in the case where the current flowing in the transistor 141 in the n-th column is smaller (larger) than the current ΔIn, the potential of a + terminal of the comparator CMP+ increases (decreases), and thus, the output of the comparator CMP+ increases (decreases). That is, the gate voltage of the transistor 144 increases (decreases); as a result, it becomes possible that a larger (smaller) current I⁺ flows.

Furthermore, since a potential which is equal to the potential of the gate of the transistor 142 is applied to the transistor 143, the current n1·⁻ obtained by multiplying the current I⁻ by n1, the W/L ratio of the transistor 143 to the transistor 142 flows in the transistor 143.

Furthermore, since a potential which is equal to the potential of the gate of the transistor 144 is applied to the transistor 145, a current n2·I⁺ obtained by multiplying the current I⁺ by n2, the W/L ratio of the transistor 145 to the transistor 144 flows in the transistor 145. The current flowing in the transistor 145 also flows in the transistor 146, and a current n3·n2·I⁺ obtained by multiplying by n3, the W/L ratio of the transistor 147 to the transistor 146 flows in the transistor 147. Owing to a buffer formed using the transistor 148, the transistor 143, and the transistor 147, the signal TRIG is set at "H".

The above configuration makes it possible to provide an imaging device capable of detecting differences with low power consumption.

This embodiment can be implemented in combination with any of the other embodiments as appropriate.

Embodiment 5

In this embodiment, a modified example of the pixel described in the above embodiment is described.

Figure 4A:
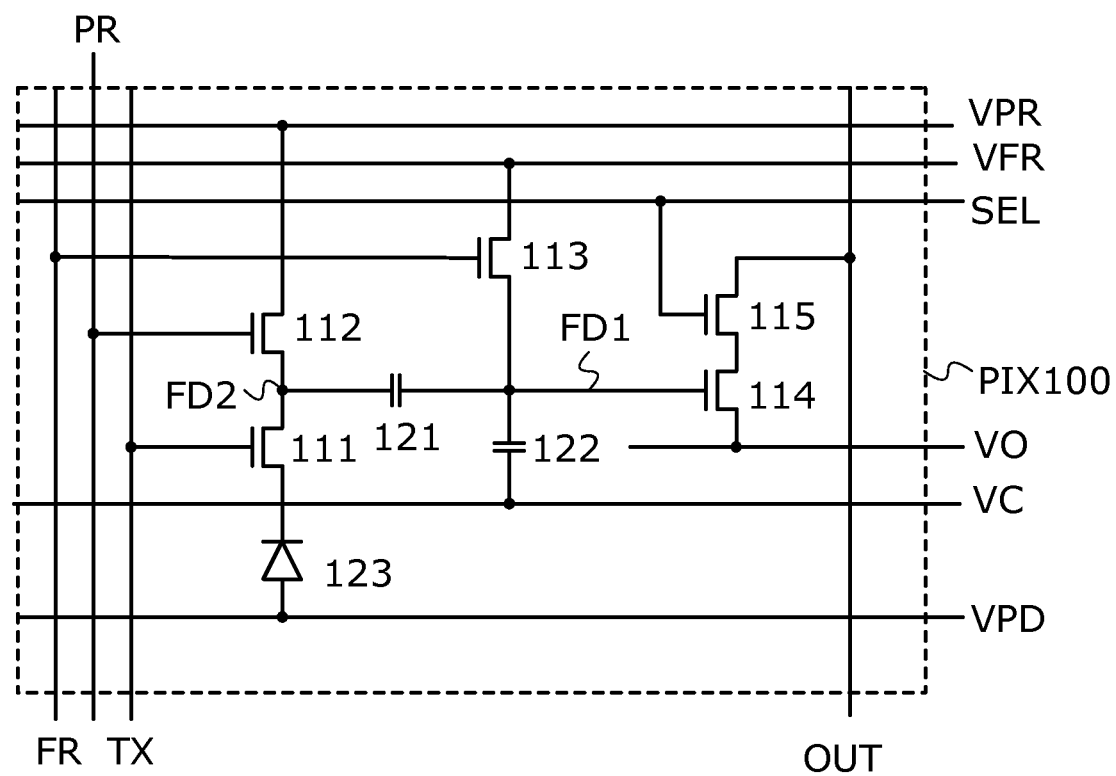
FIGS. 4A and 4B illustrate the configuration of an imaging device and its operations.
Figure 9A:
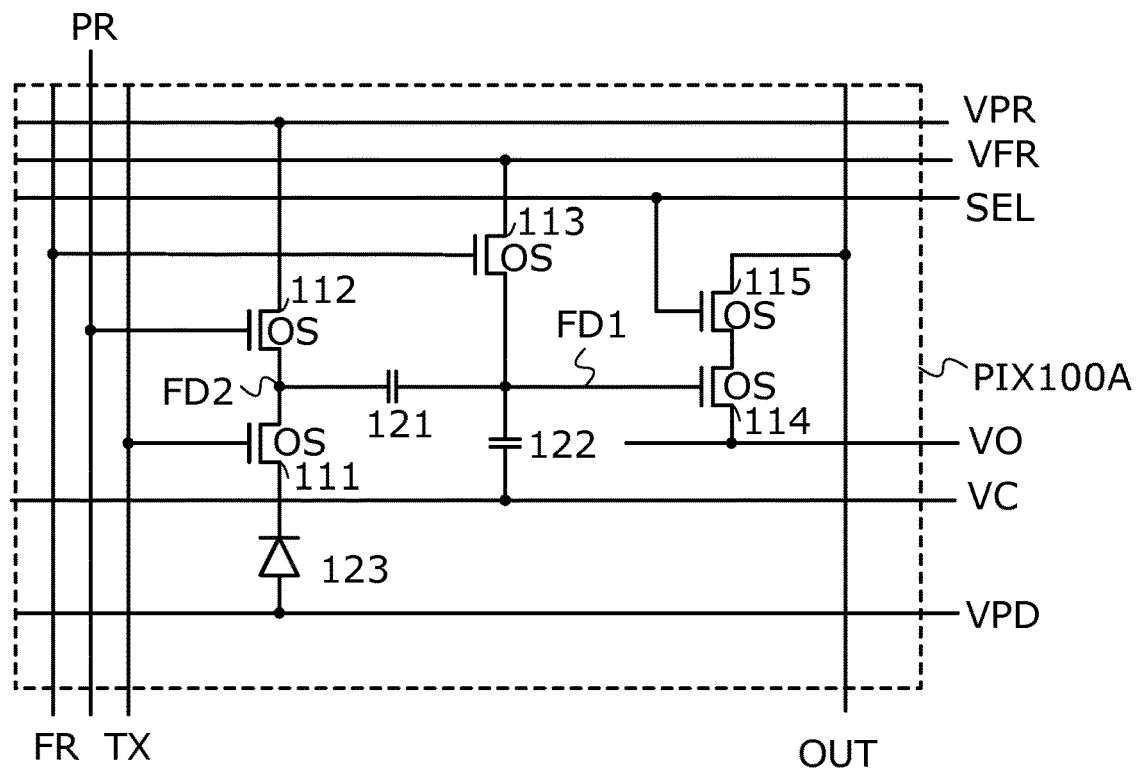
FIGS. 9A and 9B are circuit diagrams each illustrating an imaging device.

FIG. 9A illustrates a modification example of the circuit diagram in FIG. 4A in which the semiconductor layers of the transistors are each formed using an oxide semiconductor. In a pixel 100A in FIG. 9A, the transistors 111 to 115 each include an oxide semiconductor in the semiconductor layer.

Note that "OS" is written beside each circuit symbol of the transistors including an oxide semiconductor (also referred to as OS transistors) in the circuit diagram to clearly demonstrate that the transistors each include an oxide semiconductor in the semiconductor layer.

The OS transistor has a characteristic of extremely low off-state current, which can broaden the dynamic range of imaging. In the circuit in FIG. 9A, an increase in the intensity of light entering the photodiode 123 reduces the potential of the charge retention node FD1. Since the OS transistor has an extremely low off-state current, a current corresponding to the gate potential can be accurately output even when the gate potential is extremely low. Thus, it is possible to broaden the detection range of illuminance, i.e., the dynamic range.

Since a period during which charge can be retained in the charge retention node FD1 can be extremely long owing to the extremely low off-state current characteristics of the OS transistor, a global shutter system can be used without a complicated circuit configuration and operation method, and thus, an image with little distortion can be easily obtained even in the case of a moving object. Furthermore, for the same reason, exposure time (a period for conducting charge accumulation operation) can be long; thus, the imaging device is suitable for imaging even in a low illuminance environment.

The OS transistor has lower temperature dependence of change in electrical characteristics than a Si transistor. Therefore, the OS transistor can be used at an extremely wide range of temperatures. Thus, an imaging device and a semiconductor device which include OS transistors are suitable for use in automobiles, aircrafts, and spacecrafts.

Figure 9B:
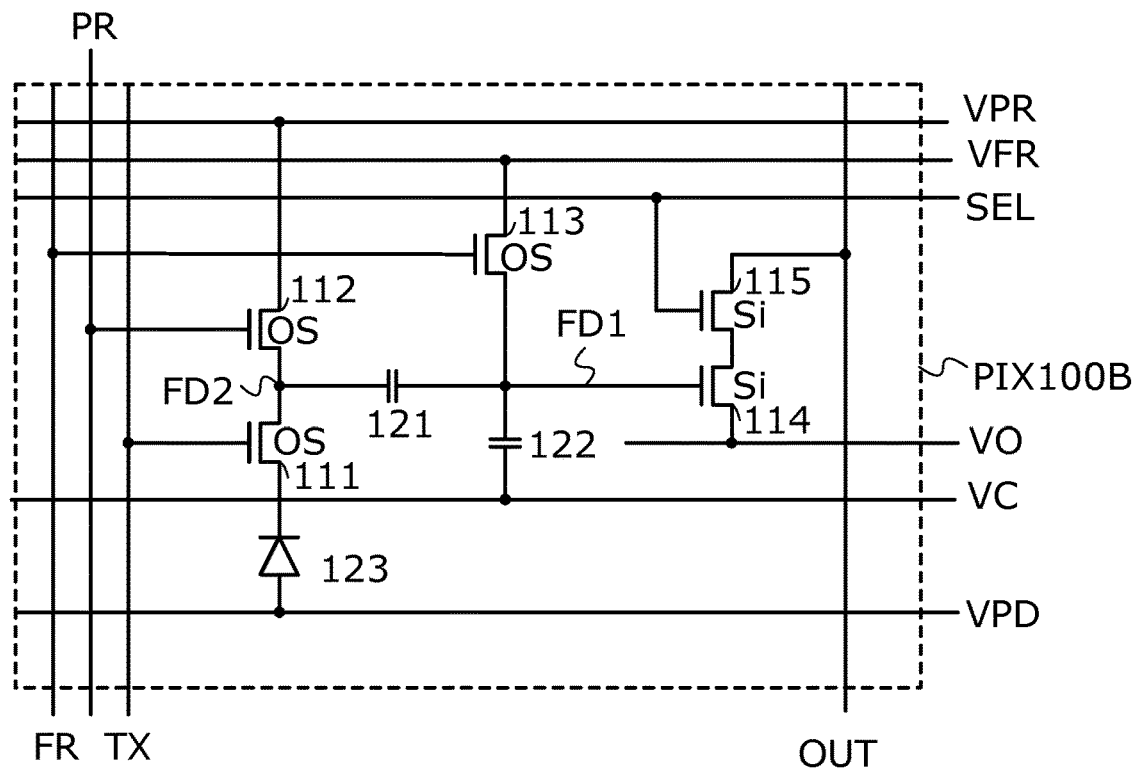

FIG. 9B is a circuit diagram of a pixel 100B, which is a modification example of the circuit diagram of FIG. 9A. In the pixel 100B in FIG. 9B, the transistors 114 and 115 each include silicon in the semiconductor layer.

Note that "Si" is written beside each circuit symbol of the transistors including silicon (also referred to as Si transistors) in the circuit diagram to clearly demonstrate that the transistors each include silicon in the semiconductor layer.

The Si transistor has a characteristic of excellent field-effect mobility as compared to the OS transistor. Therefore, the amount of current flowing in a transistor functioning as an amplifier transistor can be increased. For example, in FIG. 9B, the amount of current flowing in the transistors 114 and 115 can be increased depending on charge accumulated in the charge retention node FD1.

Figure 10:
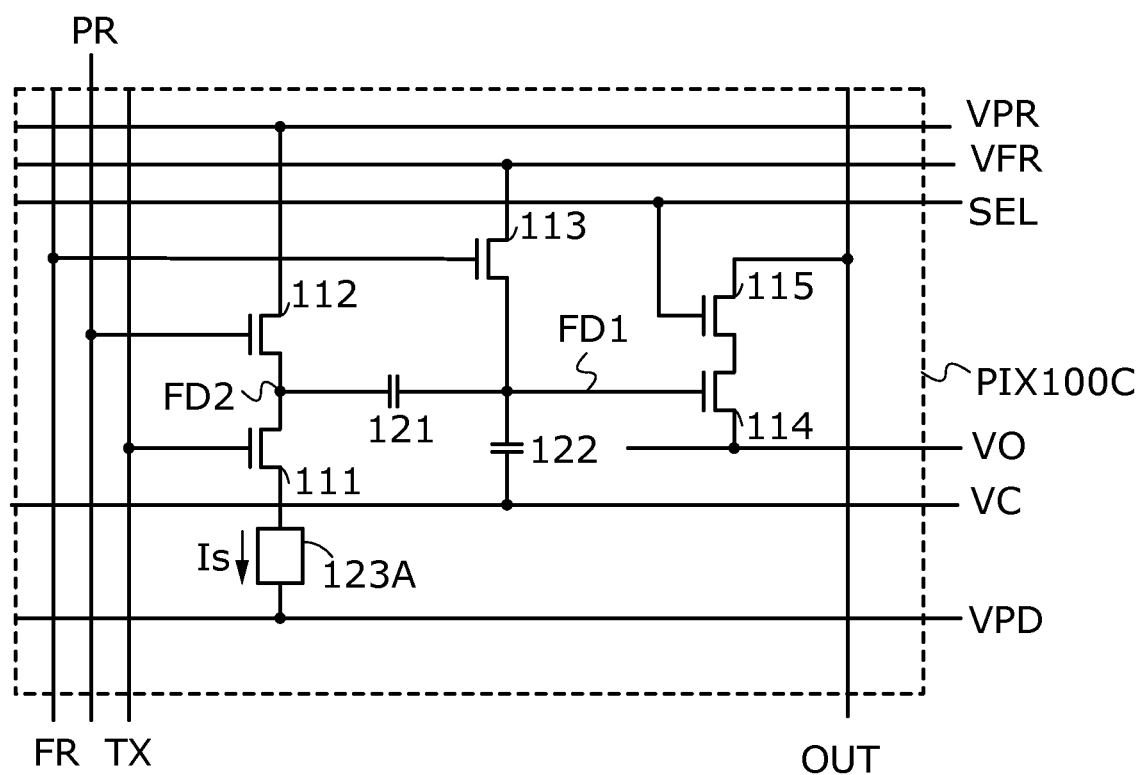
FIG. 10 is a circuit diagram illustrating an imaging device.

FIG. 10 is a circuit diagram of a pixel 100C that is the circuit diagram of FIG. 4A in which the photodiode 123 is replaced with a sensor 123A.

An element which is capable of converting a given physical amount into the amount of current flowing in the element may be preferable as the sensor 123A. Alternatively, an element which is capable of converting a given physical amount into another physical amount and then converting it into the amount of current flowing in the element may be preferable.

For the sensor 123A, a variety of sensors can be used. For example, the sensor 123A can be a temperature sensor, an optical sensor, a gas sensor, a flame sensor, a smoke sensor, a humidity sensor, a pressure sensor, a flow sensor, a vibration sensor, a voice sensor, a magnetic sensor, a radiation sensor, a smell sensor, a pollen sensor, an acceleration sensor, an inclination sensor, a gyro sensor, a direction sensor, or a power sensor.

For example, when an optical sensor is used as the sensor 123A, the above-described photodiode or a phototransistor can be used.

When a gas sensor is used as the sensor 123A, a semiconductor gas sensor which detects change in resistance due to exposure of a gas to a metal oxide semiconductor such as tin oxide, a catalytic combustion type gas sensor, or a solid electrolyte-type gas sensor can be used.

Figure 15A:
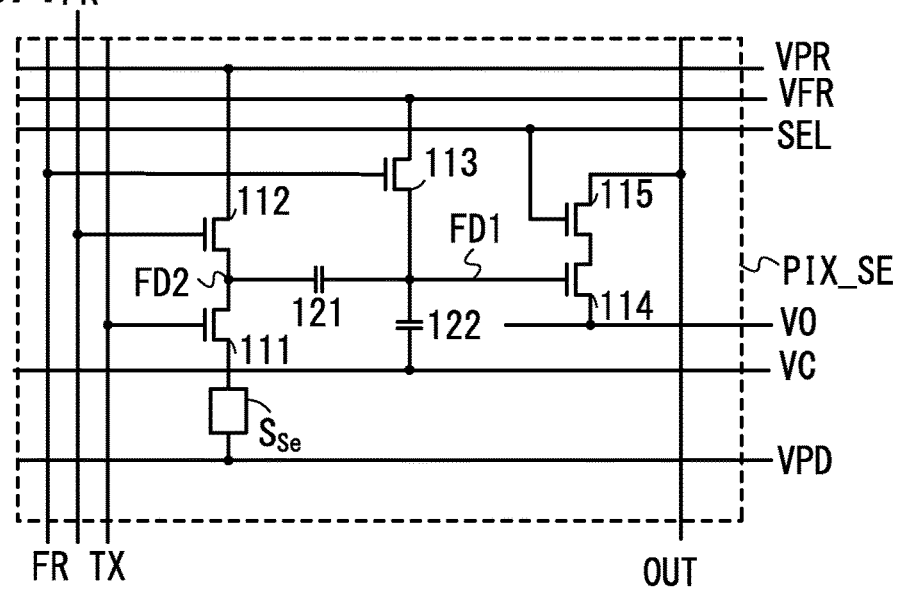
FIGS. 15A to 15C are a circuit diagram and cross-sectional views illustrating an imaging device.

FIG. 15A is a circuit diagram of a pixel PIX_SE in which the photodiode 123 of the circuit diagram of FIG. 4A or the sensor 123A of the circuit diagram of FIG. 10 is replaced with a selenium-based semiconductor element $S_{Se}$ which is a photoelectric conversion element.

The selenium-based semiconductor element $S_{Se}$ is an element which is capable of conducting photoelectric conversion utilizing a phenomenon called avalanche multiplication, in which a plurality of electrons can be taken from one incident photon by application of voltage. Therefore, in the pixel PIX_SE including the selenium-based semiconductor element $S_{Se}$, the gain of electrons to the amount of incident light can be large; therefore, a highly sensitive sensor can be obtained.

For the selenium-based semiconductor element $S_{Se}$, a selenium-based semiconductor including an amorphous structure or a selenium-based semiconductor including a crystalline structure can be used. For example, the selenium-based semiconductor including a crystalline structure may be obtained in such a manner that a selenium-based semiconductor including an amorphous structure is deposited and subjected to heat treatment. Note that it is preferable that the crystal grain diameter of the selenium-based semiconductor including a crystalline structure be smaller than a pixel pitch because variation in characteristics of the pixels is reduced and the image quality of an image to be obtained becomes uniform.

A selenium-based semiconductor including a crystalline structure among the selenium-based semiconductors has a characteristic of having a light absorption coefficient in a wide wavelength range. Therefore, the element using selenium-based semiconductor including a crystalline structure can be used as an imaging element for light in a wide wavelength range, such as visible light, ultraviolet light, X-rays, and gamma rays, and can be used as what is called a direct conversion element, which is capable of directly converting light in a short wavelength range, such as X-rays and gamma rays, into electric charge.

Figure 15B:
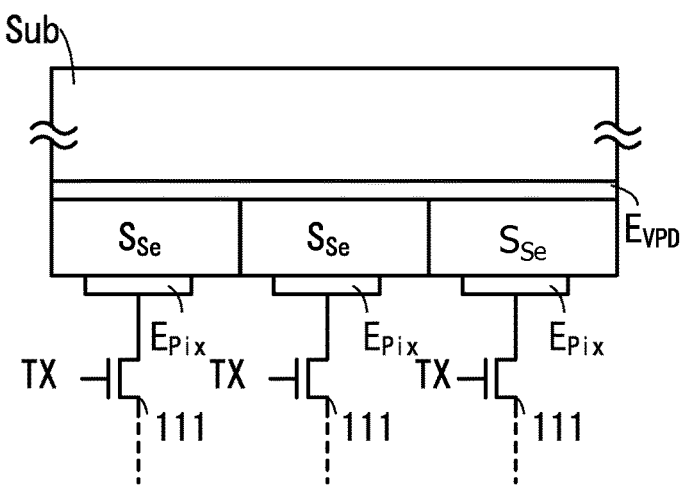

FIG. 15B is a cross-sectional schematic view corresponding to part of the circuit configuration of FIG. 15A. FIG. 15B illustrates the transistors 111, electrodes $E_{pix}$ connected to the transistors 111, the selenium-based semiconductor elements $S_{Se}$, an electrode $E_{VPD}$, and a substrate Sub.

Light is emitted from the side where the electrode $E_{VPD}$ and the substrate Sub are formed toward the selenium-based semiconductor elements $S_{Se}$. Therefore, the electrode $E_{VPD}$ and the substrate Sub preferably transmit light. Indium tin oxide (ITO) can be used for the electrode $E_{VPD}$, and a glass substrate can be used as the substrate Sub.

The selenium-based semiconductor elements $S_{Se}$ and the electrodes $E_{VPD}$ stacked over the selenium-based semiconductor elements $S_{Se}$ can be used without being processed in their shapes in accordance with each pixel. A step for processing the shape can be omitted, leading to a reduction in the manufacturing cost and improvement in the manufacturing yield.

For example, a chalcopyrite-based semiconductor can be used for the selenium-based semiconductor. Specifically, $CuIn_{1-x}Ga_xSe_2$ ($0 \leq x \leq 1$, abbreviated to CIGS) can be used, for example. CIGS can be formed by an evaporation method, a sputtering method, or the like.

The selenium-based semiconductor that is a chalcopyrite-based semiconductor can perform avalanche multiplication by being applied with a voltage of several volts (from 5 V to 20 V). By application of voltage to the selenium-based semiconductor, the movement of signal charge generated owing to light irradiation can have high linearity. Note that when the thickness of the selenium-based semiconductor is smaller than or equal to 1 μm, the application voltage can be made smaller.

Note that in the case where the thickness of the selenium-based semiconductor is small, dark current flows at the time of application of voltage; however, providing a layer for inhibiting the dark current from flowing in the CIGS that is a chalcopyrite-based semiconductor (hole-injection barrier layer) can prevent the dark current from flowing. An oxide semiconductor such as gallium oxide can be used for the hole-injection barrier layer. The thickness of the hole-injection barrier layer is preferably smaller than that of the selenium-based semiconductor.

Figure 15C:
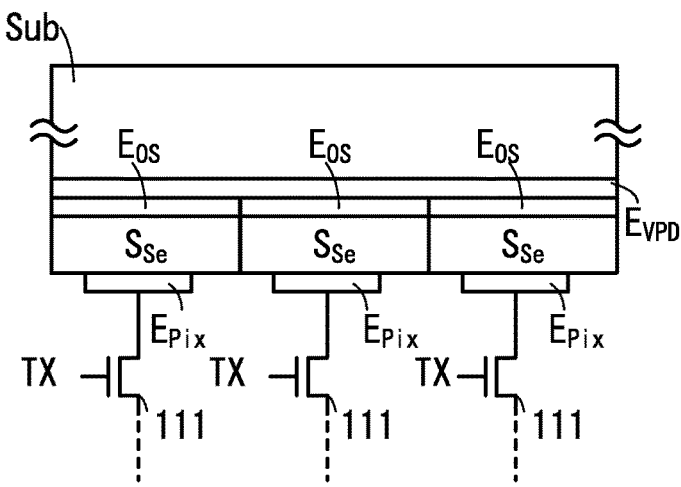

FIG. 15C is a schematic cross-sectional view different from that of FIG. 15B. FIG. 15C shows hole-injection barrier layers $E_{OS}$ together with the transistors 111, the electrodes $E_{pix}$ connected to the transistors 111, the selenium-based semiconductor elements $S_{Se}$, the electrode $E_{VPD}$, and the substrate Sub.

As described above, use of the selenium-based semiconductor element $S_{Se}$ as a sensor can reduce the manufacturing cost and characteristic variation among pixels and improves the manufacturing yield; as a result, a highly sensitive sensor can be obtained.

This embodiment can be implemented in combination with any of the other embodiments as appropriate.

Embodiment 6

In this embodiment, a cross-sectional structure of elements included in an imaging device is described with reference to drawings. A cross section of the structure described in FIG. 9B in Embodiment 4, in which a pixel is formed using the Si transistors and the OS transistors, is described in this embodiment as an example.

Figure 11:
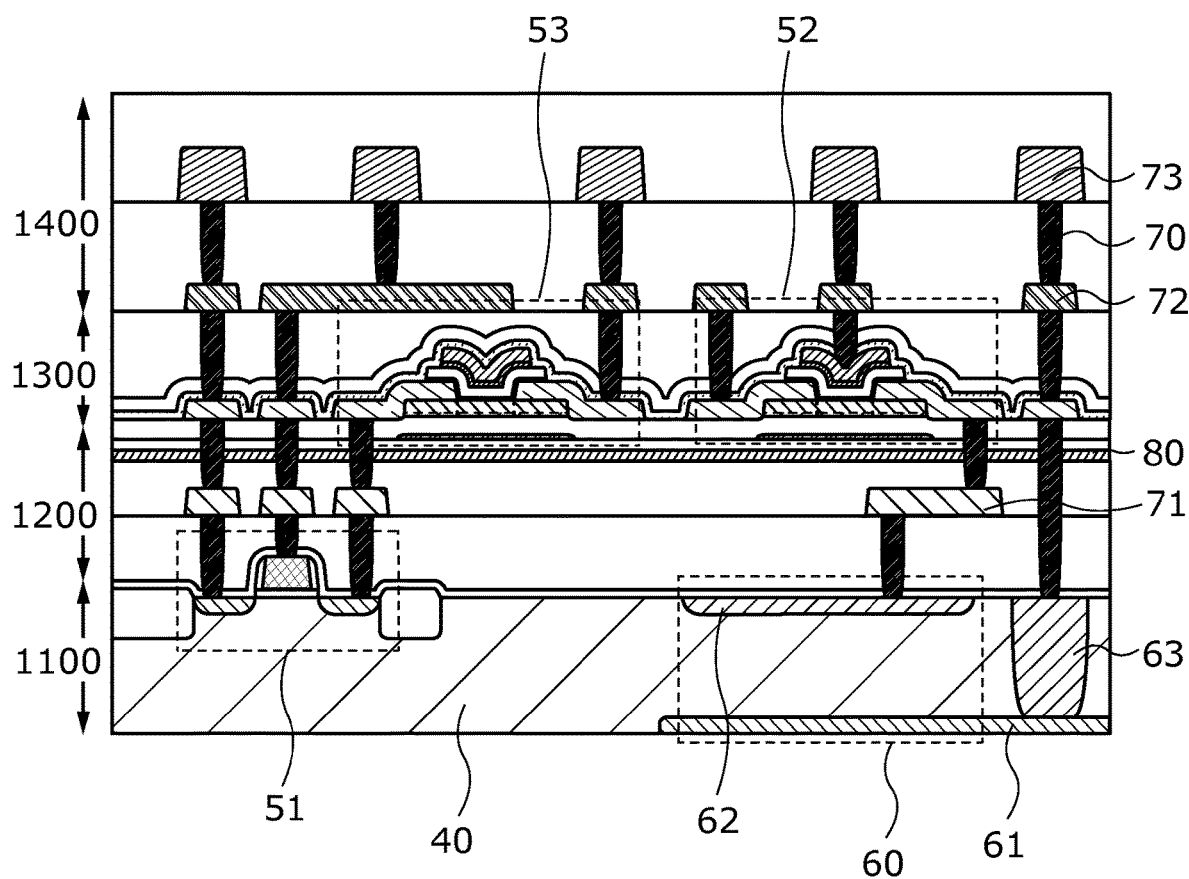
FIG. 11 is a cross-sectional view illustrating an imaging device.

FIG. 11 is a cross-sectional view of elements included in an imaging device. The imaging device in FIG. 11 includes a Si transistor 51 provided on a silicon substrate 40, OS transistors 52 and 53 stacked over the Si transistor 51, and a photodiode 60 provided in the silicon substrate 40. The transistors and the photodiode 60 are electrically connected to contact plugs 70 and wiring layers 71. In addition, an anode 61 of the photodiode 60 is electrically connected to the contact plug 70 through a low-resistance region 63.

The imaging device includes a layer 1100 including the Si transistor 51 provided on the silicon substrate 40 and the photodiode 60 provided in the silicon substrate 40, a layer 1200 which is in contact with the layer 1100 and includes the wiring layers 71, a layer 1300 which is in contact with the layer 1200 and includes the OS transistors 52 and 53, and a layer 1400 which is in contact with the layer 1300 and includes wiring layers 72 and wiring layers 73.

In the example of the cross-sectional view in FIG. 11, a surface of the silicon substrate 40 opposite to a surface where the Si transistor 51 is formed includes a light-receiving surface of the photodiode 60. With the structure, an optical path can be obtained without the influence by the transistors or wirings, and therefore, a pixel with a high aperture ratio can be formed. Note that the light-receiving surface of the photodiode 60 can be the same as the surface where the Si transistor 51 is formed.

Note that in the case where the pixel is formed using the OS transistors described in FIG. 9A in Embodiment 4, a layer including the OS transistors may be used as the layer 1100. Alternatively, a structure in which the layer 1100 is not provided and the pixel is formed using only OS transistors may be employed.

Note that the silicon substrate 40 is not limited to a bulk silicon substrate and may be an SOI substrate. Furthermore, the silicon substrate 40 can be replaced with a substrate made of germanium, silicon germanium, silicon carbide, gallium arsenide, aluminum gallium arsenide, indium phosphide, gallium nitride, or an organic semiconductor.

An insulating layer 80 is provided between the layer 1100 including the Si transistor 51 and the photodiode 60 and the layer 1300 including the OS transistors 52 and 53 although there is no limitation on its specific position.

Hydrogen in an insulating layer provided in the vicinity of the active region of the Si transistor 51 terminates dangling bonds of silicon; accordingly, the reliability of the Si transistor 51 can be improved. Meanwhile, hydrogen in insulating layers provided in the vicinities of the oxide semiconductor layers, which are the active layers, of the OS transistors 52 and 53 provided in an upper portion becomes a factor of generating carriers in the oxide semiconductor; thus, the reliability of the OS transistors 52 and 53 might be decreased. Therefore, in the case where the transistor using an oxide semiconductor is provided over the transistor using a silicon-based semiconductor material, it is preferable that the insulating layer 80 having a function of preventing diffusion of hydrogen be provided between the transistors. The insulating layer 80 makes hydrogen remain in the lower portion, thereby improving the reliability of the Si transistor 51. In addition, since the insulating layer 80 prevents diffusion of hydrogen from the lower portion to the upper portion, the reliability of the OS transistors 52 and 53 also can be improved.

The insulating layer 80 can be, for example, formed using aluminum oxide, aluminum oxynitride, gallium oxide, gallium oxynitride, yttrium oxide, yttrium oxynitride, hafnium oxide, hafnium oxynitride, or yttria-stabilized zirconia (YSZ).

In the cross-sectional view of FIG. 11, the photodiode 60 provided in the layer 1100 and the transistors provided in the layer 1300 can be formed to overlap each other. This structure can increase the degree of integration of pixels. In other words, the resolution of the imaging device can be increased.

This embodiment can be implemented in combination with any of the other embodiments as appropriate.

Embodiment 7

In this embodiment, a cross-sectional structure of an example of an image device including a color filter and the like is described with reference to drawings.

Figure 12A:
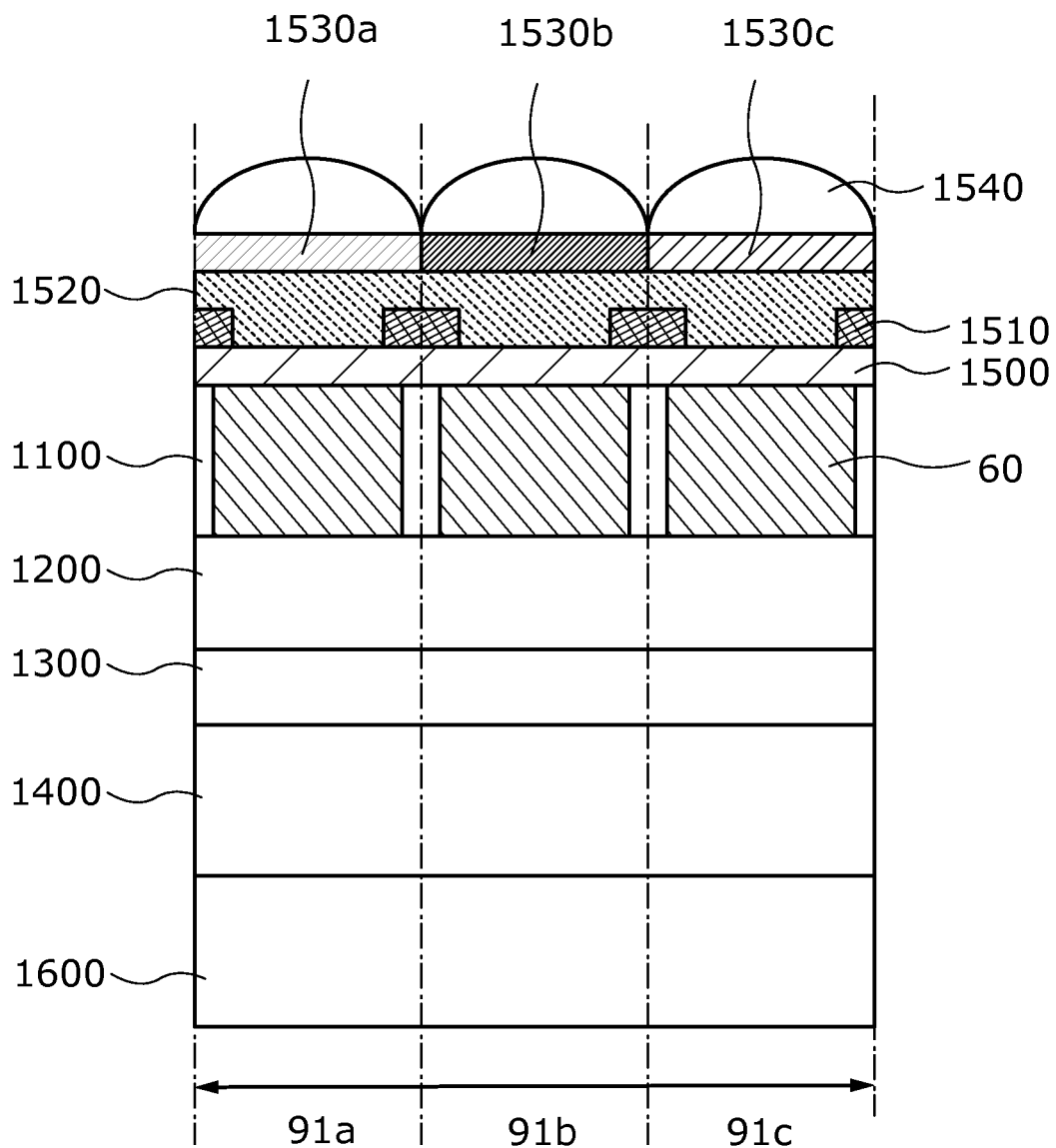
FIGS. 12A and 12B are cross-sectional views illustrating an imaging device.

FIG. 12A is a cross-sectional view of an example of a mode in which a color filter and the like are added to the imaging device in FIG. 11, illustrating a region occupied by circuits (circuits 91a, 91b, and 91c) corresponding to three pixels. An insulating layer 1500 is formed over the photodiode 60 provided in the layer 1100. As the insulating layer 1500, for example, a silicon oxide film with a high visible-light transmitting property can be used. In addition, a silicon nitride film may be stacked as a passivation film. In addition, a dielectric film of hafnium oxide or the like may be stacked as an anti-reflection film.

A light-blocking layer 1510 is formed over the insulating layer 1500. The light-blocking layer 1510 has a function of inhibiting color mixing of light passing through the color filter. The light-blocking layer 1510 can be formed of a metal layer of aluminum, tungsten, or the like, or a stack including the metal layer and a dielectric film functioning as an anti-reflection film.

An organic resin layer 1520 is formed as a planarization film over the insulating layer 1500 and the light-blocking layer 1510. A color filter 1530a, a color filter 1530b, and a color filter 1530c are formed over the circuit 91a, the circuit 91b, and the circuit 91c to be paired up with the circuit 91a, the circuit 91b, and the circuit 91c, respectively. The color filter 1530a, the color filter 1530b, and the color filter 1530c have colors of R (red), G (green), and B (blue), whereby a color image can be obtained.

A microlens array 1540 is provided over the color filters 1530a, 1530b, and 1530c so that light passing through a lens further passes through the color filter positioned under the lens to reach the photodiode.

A supporting substrate 1600 is provided in contact with the layer 1400. As the supporting substrate 1600, a hard substrate such as a semiconductor substrate (e.g., a silicon substrate), a glass substrate, a metal substrate, or a ceramic substrate can be used. Note that an inorganic insulating layer or an organic resin layer as an adhering layer may be between the layer 1400 and the supporting substrate 1600.

Figure 12B:
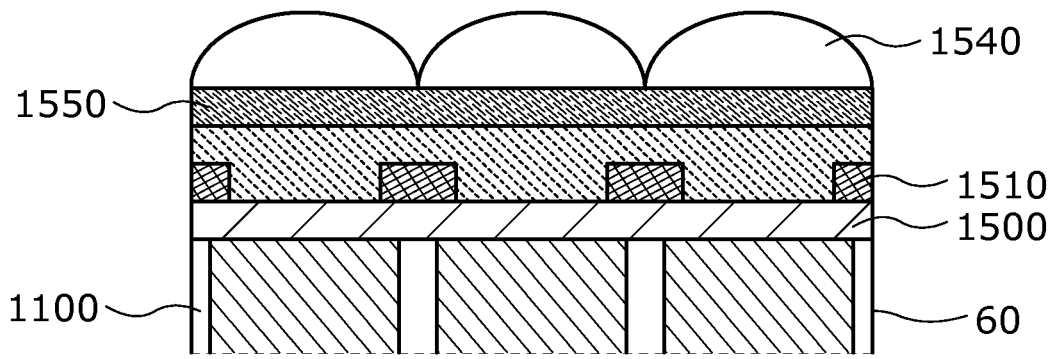

In the structure of the imaging device, an optical conversion layer 1550 may be used instead of the color filters 1530a, 1530b, and 1530c (see FIG. 12B). When the optical conversion layer 1550 is used instead, the imaging device can capture images in various wavelength regions.

For example, when a filter which blocks light having a wavelength shorter than or equal to that of visible light is used as the optical conversion layer 1550, an infrared imaging device can be obtained. When a filter which blocks light having a wavelength shorter than or equal to that of near infrared light is used as the optical conversion layer 1550, a far-infrared imaging device can be obtained. When a filter which blocks light having a wavelength longer than or equal to that of visible light is used as the optical conversion layer 1550, an ultraviolet imaging device can be obtained.

Furthermore, when a scintillator is used as the optical conversion layer 1550, an imaging device which captures an image visualizing the intensity of radiation, such as a medical X-ray imaging device, can be obtained. Radiation such as X-rays passes through a subject to enter a scintillator, and then is converted into light (fluorescence) such as visible light or ultraviolet light owing to a phenomenon known as photoluminescence. Then, the photodiode 60 detects the light to obtain image data.

The scintillator is formed of a substance that, when irradiated with radial rays such as X-rays or gamma-rays, absorbs energy of the radial rays to emit visible light or ultraviolet light or a material containing the substance. For example, materials such as $Gd_2O_2S$:Tb, $Gd_2O_2S$:Pr, $Gd_2O_2S$:Eu, BaFCl:Eu, NaI, CsI, $CaF_2$, $BaF_2$, $CeF_3$, LiF, LiI, and ZnO and a resin or ceramics in which any of the materials is dispersed are known.

This embodiment can be implemented in an appropriate combination with any of the structures described in the other embodiments.

Embodiment 8

In this embodiment, an application of the OS transistor described in the embodiment is described.

The off-state current of an OS transistor can be reduced by reducing the concentration of impurities in an oxide semiconductor to make the oxide semiconductor intrinsic or substantially intrinsic. The term "substantially intrinsic" refers to a state where an oxide semiconductor has a carrier density lower than $1 \times 10^{17}/cm^3$, preferably lower than $1 \times 10^{15}/cm^3$, further preferably lower than $1 \times 10^{13}/cm^3$. In the oxide semiconductor, hydrogen, nitrogen, carbon, silicon, and a metal element other than a main component are impurities. For example, hydrogen and nitrogen form donor levels to increase the carrier density, and silicon forms impurity levels in the oxide semiconductor layer.

A transistor using an intrinsic or substantially intrinsic oxide semiconductor has a low carrier density and thus is less likely to have negative threshold voltage. In addition, because of few carrier traps in the oxide semiconductor, the transistor including the oxide semiconductor has small variation in electrical characteristics and high reliability.

Furthermore, a transistor including the oxide semiconductor enables an extremely low off-state current.

For example, the OS transistor with reduced off-state current can exhibit a normalized off-state current per micrometer in channel width of less than or equal to $1 \times 10^{-18}$ A, preferably less than or equal to $1 \times 10^{-21}$ A, further preferably less than or equal to $1 \times 10^{-24}$ A at room temperature (approximately 25° C.); or less than or equal to $1 \times 10^{-15}$ A, preferably less than or equal to $1 \times 10^{-18}$ A, further preferably less than or equal to $1 \times 10^{-21}$ A at 85° C.

Note that the off-state current of an n-channel transistor refers to a current that flows between a source and a drain when the transistor is off. For example, the off-state current of an n-channel transistor with a threshold voltage of about 0 V to 2 V refers to a current that flows between a source and a drain when a negative voltage is applied between a gate and the source.

Note that at least indium (In) or zinc (Zn) is preferably contained as an oxide semiconductor used for the semiconductor layer of the OS transistor. In particular, In and Zn are preferably contained. A stabilizer for strongly bonding oxygen is preferably contained in addition to In and Zn. As a stabilizer, at least one of gallium (Ga), tin (Sn), zirconium (Zr), hafnium (Hf), and aluminum (Al) may be contained.

As another stabilizer, one or plural kinds of lanthanoid such as lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu) may be contained.

As an oxide semiconductor used for the semiconductor layer of the transistor, for example, any of the following can be used: indium oxide, tin oxide, zinc oxide, an In—Zn-based oxide, a Sn—Zn-based oxide, an Al—Zn-based oxide, a Zn—Mg-based oxide, a Sn—Mg-based oxide, an In—Mg-based oxide, an In—Ga-based oxide, an In—Ga—Zn-based oxide (also referred to as IGZO), an In—Al—Zn-based oxide, an In—Sn—Zn-based oxide, a Sn—Ga—Zn-based oxide, an Al—Ga—Zn-based oxide, a Sn—Al—Zn-based oxide, an In—Hf—Zn-based oxide, an In—Zr—Zn-based oxide, an In—Ti—Zn-based oxide, an In—Sc—Zn-based oxide, an In—Y—Zn-based oxide, an In—La—Zn-based oxide, an In—Ce—Zn-based oxide, an In—Pr—Zn-based oxide, an In—Nd—Zn-based oxide, an In—Sm—Zn-based oxide, an In—Eu—Zn-based oxide, an In—Gd—Zn-based oxide, an In—Tb—Zn-based oxide, an In—Dy—Zn-based oxide, an In—Ho—Zn-based oxide, an In—Er—Zn-based oxide, an In—Tm—Zn-based oxide, an In—Yb—Zn-based oxide, an In—Lu—Zn-based oxide, an In—Sn—Ga—Zn-based oxide, an In—Hf—Ga—Zn-based oxide, an In—Al—Ga—Zn-based oxide, an In—Sn—Al—Zn-based oxide, an In—Sn—Hf—Zn-based oxide, and an In—Hf—Al—Zn-based oxide.

For example, an In—Ga—Zn-based oxide with an atomic ratio of In:Ga:Zn=1:1:1, In:Ga:Zn=3:1:2, or In:Ga:Zn=2:1:3, or an oxide with an atomic ratio close to the above atomic ratios can be used.

When the oxide semiconductor film forming the semiconductor layer contains a large amount of hydrogen, the hydrogen and the oxide semiconductor are bonded to each other, so that part of the hydrogen serves as a donor and causes generation of an electron which is a carrier. As a result, the threshold voltage of the transistor shifts in the negative direction. Therefore, it is preferable that, after formation of the oxide semiconductor film, dehydration treatment (dehydrogenation treatment) be performed to remove hydrogen or moisture from the oxide semiconductor film so that the oxide semiconductor film is highly purified to contain impurities as little as possible.

Note that oxygen in the oxide semiconductor film is also reduced by the dehydration treatment (dehydrogenation treatment) in some cases. Therefore, it is preferable that oxygen whose amount is reduced in the dehydration treatment (dehydrogenation treatment) be added to the oxide semiconductor or oxygen be supplied excessively to fill the oxygen vacancies in the oxide semiconductor film.

In this manner, hydrogen or moisture is removed from the oxide semiconductor film by the dehydration treatment (dehydrogenation treatment) and oxygen vacancies therein are filled by the oxygen adding treatment, whereby the oxide semiconductor film can be turned into an i-type (intrinsic) or substantially i-type (intrinsic) oxide semiconductor film which is extremely close to an i-type oxide semiconductor film. Note that "substantially intrinsic" means that the oxide semiconductor film contains extremely few (close to zero) carriers derived from a donor and has a carrier density of lower than or equal to $1 \times 10^{17}/cm^3$, lower than or equal to $1 \times 10^{16}/cm^3$, lower than or equal to $1 \times 10^{15}/cm^3$, lower than or equal to $1 \times 10^{14}/cm^3$, or lower than or equal to $1 \times 10^{13}/cm^3$.

Thus, the transistor including an i-type or substantially i-type oxide semiconductor film can have extremely favorable off-state current characteristics.

This embodiment can be implemented in an appropriate combination with any of the structures described in the other embodiments.

Embodiment 9

In this embodiment, a case where the imaging device described in the above embodiment is used for a monitoring device (also referred to as a monitoring system) is described.

Figure 13:
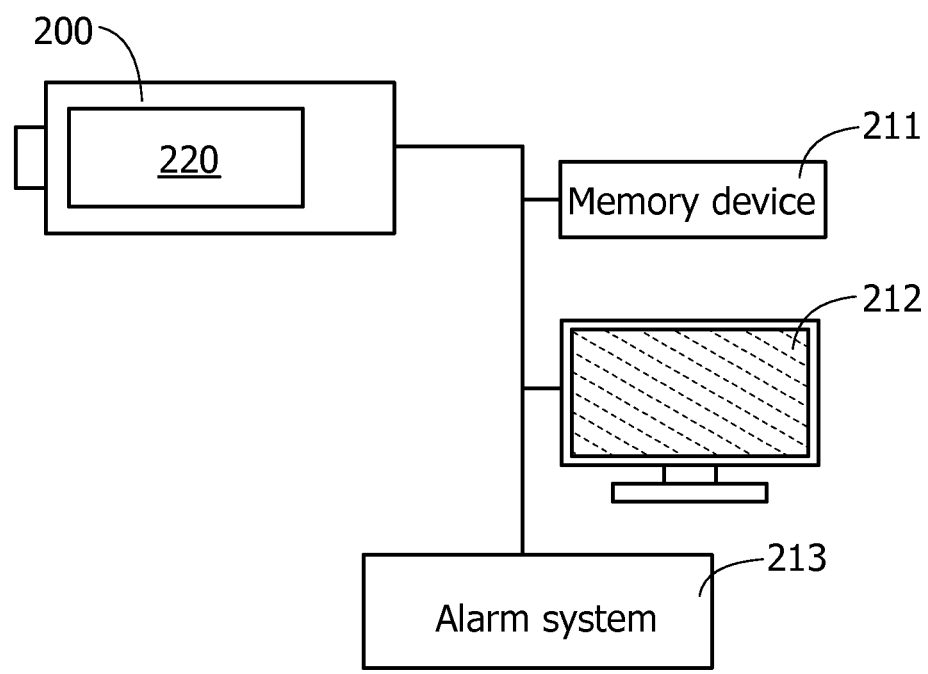
FIG. 13 is a block diagram illustrating an example of a configuration of a monitoring system.

FIG. 13 is a block diagram illustrating the structural example of the monitoring device of this embodiment. The monitoring device includes a camera 200, a memory device 211, a display device 212, and an alarm device 213. The camera 200 includes an imaging device 220. An image captured by the camera 200 is stored in the memory device 211 and displayed on the display device 212. The alarm device 213 gives an alarm to an administrator when the camera 200 detects movement.

In the imaging device 220, a trigger signal is generated when the camera 200 detects difference data. Analog processing continues when the trigger signal is not generated, whereas digital processing is performed when the trigger signal is generated. Therefore, it is not necessary to continuously perform digital processing, which consumes a vast amount of power; thus, power consumption can be reduced.

For example, the first state is set to a state where there is surely no intruder entering the monitored area, and the second state is set to the current state. Here, when there is not intruder in the state where the imaging device 220 operates in the first mode, the first imaging data is the same as the second data, and thus difference data is zero. Accordingly, the result of a sum-of-absolute-difference operation performed on the difference data read from each pixel in the analog processing circuit is zero, and no trigger signal is generated. In contrast, when there is an intruder, the first imaging data is different from the second imaging data, and thus, difference data is infinite. Accordingly, the result of a sum-of-absolute-difference operation performed on the difference data read from each pixel in the analog processing circuit is finite, and the trigger signal is generated. The mode of the imaging device 220 is switched to the second mode in response to the generation of the trigger signal, third imaging data is converted into digital data in the digital processing circuit, and detailed analysis of the captured image is executed by digital processing with a personal computer or the like. As a result, detailed information on the intruder can be obtained.

Therefore, in a period in which movement in the image is not detected, the imaging device 220 does not execute digital processing. As a result, the power consumption in the camera 200 can be reduced. Furthermore, since the memory capacity of the memory device 211 can be saved by image data in the period in which no movement is detected, recording for a longer period is possible.

Note that the alarm device 213 may give an alarm to those around the alarm device 213 when the trigger signal is generated. Alternatively, whether or not an alarm is given may be determined on the basis of a result of comparison by a certification system.

This embodiment can be implemented in an appropriate combination with any of the structures described in the other embodiments.

Embodiment 10

In this embodiment, examples of an electronic appliance including the imaging device of one embodiment of the present invention are described.

Examples of an electronic appliance including the imaging device of one embodiment of the present invention are as follows: display devices such as televisions and monitors, lighting devices, desktop personal computers and laptop personal computers, word processors, image reproduction devices which reproduce still images and moving images stored in recording media such as digital versatile discs (DVDs), portable CD players, radios, tape recorders, headphone stereos, stereos, navigation systems, table clocks, wall clocks, cordless phone handsets, transceivers, mobile phones, car phones, portable game consoles, tablet terminals, large game machines such as pinball machines, calculators, portable information terminals, electronic notebooks, e-book readers, electronic translators, audio input devices, video cameras, digital still cameras, electric shavers, high-frequency heating appliances such as microwave ovens, electric rice cookers, electric washing machines, electric vacuum cleaners, water heaters, electric fans, hair dryers, air-conditioning systems such as air conditioners, humidifiers, and dehumidifiers, dishwashers, dish dryers, clothes dryers, futon dryers, electric refrigerators, electric freezers, electric refrigerator-freezers, freezers for preserving DNA, flashlights, electric power tools such as chain saws, smoke detectors, medical equipment such as dialyzers, facsimiles, printers, multifunction printers, automated teller machines (ATM), and vending machines. Furthermore, industrial equipment such as guide lights, traffic lights, belt conveyors, elevators, escalators, industrial robots, power storage systems, and power storage devices for leveling the amount of power supply and smart grid can be given. In addition, moving objects and the like driven by fuel engines and electric motors using power from non-aqueous secondary batteries are also included in the category of electronic appliances. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, motorized bicycles including motor-assisted bicycles, motorcycles, electric wheelchairs, golf carts, boats, ships, submarines, helicopters, aircrafts, rockets, artificial satellites, space probes, planetary probes, and spacecrafts.

Figure 14A:
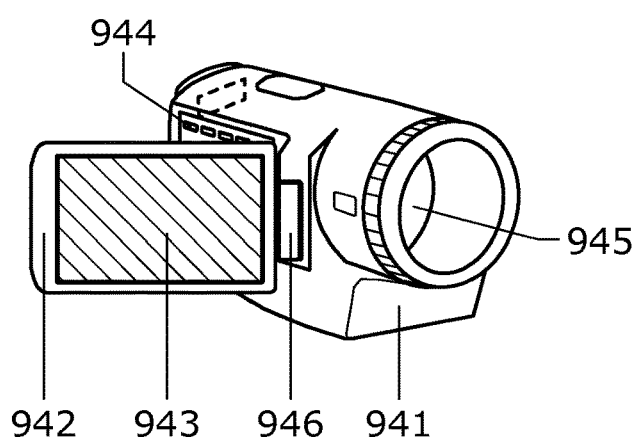
FIGS. 14A to 14F each illustrate an electronic appliance including an imaging device.

FIG. 14A illustrates a video camera including a housing 941, a housing 942, a display portion 943, operation keys 944, a lens 945, a joint 946, and the like. The operation keys 944 and the lens 945 are provided in the housing 941, and the display portion 943 is provided in the housing 942. The housing 941 and the housing 942 are connected to each other with the joint 946, and the angle between the housing 941 and the housing 942 can be changed with the joint 946. Images displayed on the display portion 943 may be switched in accordance with the angle at the joint 946 between the housing 941 and the housing 942. The imaging device of one embodiment of the present invention can be provided in a focus position of the lens 945.

Figure 14B:
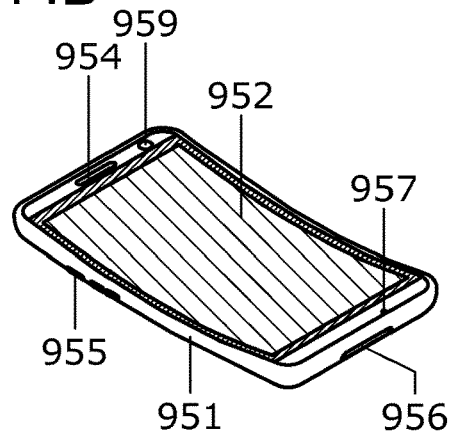

FIG. 14B illustrates a mobile phone which includes a display portion 952, a microphone 957, a speaker 954, a camera 959, an input/output terminal 956, an operation button 955, and the like in a housing 951. The imaging device of one embodiment of the present invention can be used for the camera 959.

Figure 14C:
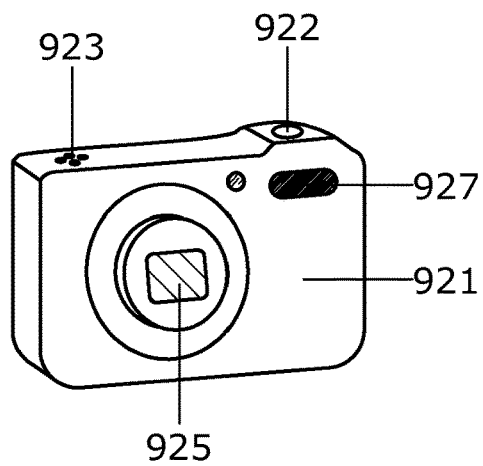

FIG. 14C illustrates a digital camera which includes a housing 921, a shutter button 922, a microphone 923, a light-emitting portion 927, a lens 925, and the like. The imaging device of one embodiment of the present invention can be provided in a focus position of the lens 925.

Figure 14D:
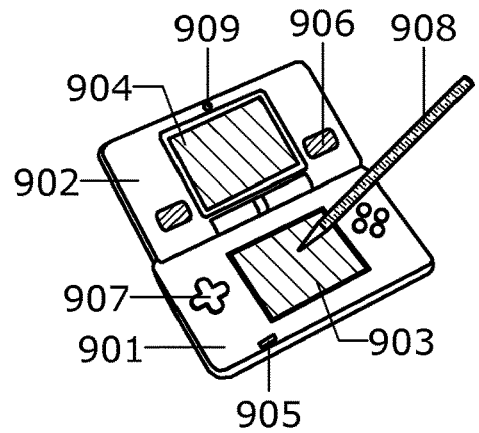

FIG. 14D illustrates a portable game console which includes a housing 901, a housing 902, a display portion 903, a display portion 904, a microphone 905, a speaker 906, an operation key 907, a stylus 908, a camera 909, and the like. Although the portable game console in FIG. 14A has the two display portions 903 and 904, the number of display portions included in a portable game console is not limited to this. The imaging device of one embodiment of the present invention can be used for the camera 909.

Figure 14E:
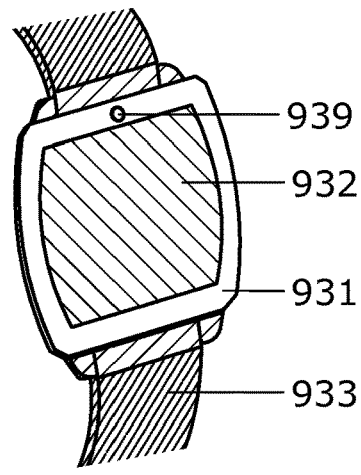

FIG. 14E illustrates a wrist-watch-type information terminal which includes a housing 931, a display portion 932, a wristband 933, a camera 939, and the like. The display portion 932 may be a touch panel. The imaging device of one embodiment of the present invention can be used for the camera 939.

Figure 14F:
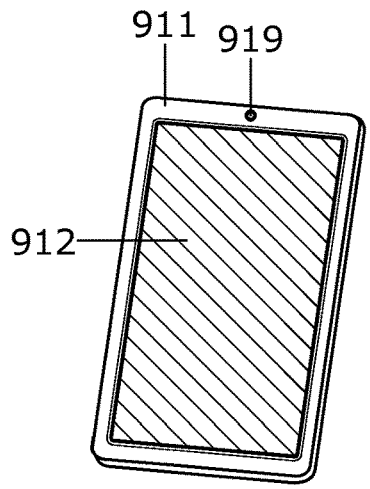

FIG. 14F illustrates a portable data terminal which includes a housing 911, a display portion 912, a camera 919, and the like. A touch panel function of the display portion 912 enables input and output of information. The imaging device of one embodiment of the present invention can be used for the camera 919.

Needless to say, the examples are not limited to the above-described electronic appliances as long as the imaging device of one embodiment of the present invention is included.

This embodiment can be implemented in an appropriate combination with any of the structures described in the other embodiments.

This application is based on Japanese Patent Application serial no. 2014-101910 filed with Japan Patent Office on May 16, 2014, Japanese Patent Application serial no. 2014-104842 filed with Japan Patent Office on May 21, 2014, Japanese Patent Application serial no. 2014-129984 filed with Japan Patent Office on Jun. 25, 2014, and Japanese Patent Application serial no. 2014-129988 filed with Japan Patent Office on Jun. 25, 2014, the entire contents of which are hereby incorporated by reference.

What is claimed is:

1. An imaging device comprising:
a pixel comprising a photoelectric conversion element, first to fifth transistors, and first and second capacitors;
an analog processing circuit; and
a digital processing circuit,
wherein the imaging device operates in a first mode and a second mode,
wherein in the first mode, difference data between first imaging data taken by the pixel at a first time and second imaging data taken by the pixel at a second time is obtained by the pixel, and the analog processing circuit performs a sum-of-absolute-difference operation of the difference data and generates a trigger signal when a movement is detected from the first and second imaging data,
wherein in the second mode, the digital processing circuit converts third imaging data taken by the pixel at a third time into digital data,
wherein switching from the first mode to the second mode is performed on the basis of the trigger signal,
wherein one of a source and a drain of the first transistor is electrically connected to the photoelectric conversion element,
wherein the other of the source and the drain of the first transistor is electrically connected to one of a source and a drain of the second transistor and a first terminal of the first capacitor,
wherein one of a source and a drain of the third transistor is electrically connected to a second terminal of the first capacitor, a first terminal of the second capacitor, and a gate of the fourth transistor,
wherein one of a source and a drain of the fourth transistor is electrically connected to one of a source and a drain of the fifth transistor, and
wherein the other of the source and the drain of the fifth transistor is electrically connected to the analog processing circuit.

2. The imaging device according to claim 1,
wherein the analog processing circuit supplies current in accordance with a difference between a reference current value and a current value, and generates the trigger signal in response to the current, and
wherein the current value is determined by a difference between the first imaging data and the second imaging data.

3. The imaging device according to claim 1, wherein the analog processing circuit includes a subtraction circuit, an absolute value circuit, and an adder circuit.

4. The imaging device according to claim 1, wherein the digital processing circuit includes an A/D converter circuit.

5. The imaging device according to claim 1, wherein switching from the second mode to the first mode is performed in the imaging device when a predetermined period of time has passed.

6. A monitoring device comprising:
a camera including the imaging device according to claim 1;
a display device electrically connected to the camera;
a memory device electrically connected to the camera; and
an alarm device electrically connected to the camera.

7. An electronic appliance comprising:
the imaging device according to claim 1; and
an operation key.

8. The imaging device according to claim 1, wherein the first imaging data and the second imaging data are analog signals.

9. An imaging device comprising:
a pixel comprising a photoelectric conversion element, first to fifth transistors, and first and second capacitors;

an analog processing circuit; and
a digital processing circuit,
wherein the imaging device operates in a first mode and a second mode,
wherein in the first mode, difference data between first imaging data taken by the pixel at a first time and second imaging data taken by the pixel at a second time is stored in the pixel, and the analog processing circuit reads the difference data to perform a sum-of-absolute-difference operation of the difference data and generates a trigger signal when a movement is detected from the first and second imaging data,
wherein in the second mode, third imaging data taken by the pixel at a third time is stored in the pixel, the digital processing circuit converts the third imaging data into digital data,
wherein switching from the first mode to the second mode is performed on the basis of the trigger signal,
wherein one of a source and a drain of the first transistor is electrically connected to the photoelectric conversion element,
wherein the other of the source and the drain of the first transistor is electrically connected to one of a source and a drain of the second transistor and a first terminal of the first capacitor,
wherein one of a source and a drain of the third transistor is electrically connected to a second terminal of the first capacitor, a first terminal of the second capacitor, and a gate of the fourth transistor,
wherein one of a source and a drain of the fourth transistor is electrically connected to one of a source and a drain of the fifth transistor, and wherein the other of the source and the drain of the fifth transistor is electrically connected to the analog processing circuit.

10. The imaging device according to claim 9,
wherein the analog processing circuit supplies current in accordance with a difference between a reference current value and a current value, and generates the trigger signal in response to the current, and
wherein the current value is determined by the difference data.

11. The imaging device according to claim 9, wherein the analog processing circuit includes a subtraction circuit, an absolute value circuit, and an adder circuit.

12. The imaging device according to claim 9, wherein the digital processing circuit includes an A/D converter circuit.

13. The imaging device according to claim 9, wherein switching from the second mode to the first mode is performed in the imaging device when a predetermined period of time has passed.

14. A monitoring device comprising:
a camera including the imaging device according to claim 9;
a display device electrically connected to the camera;
a memory device electrically connected to the camera; and
an alarm device electrically connected to the camera.

15. An electronic appliance comprising:
the imaging device according to claim 9; and
an operation key.

16. The imaging device according to claim 9, wherein the first imaging data and the second imaging data are analog signals.

* * * * *